US012109690B2

(12) United States Patent
Kastler et al.

(10) Patent No.: US 12,109,690 B2
(45) Date of Patent: Oct. 8, 2024

(54) ARM MODULE, ROBOT ARM AND INDUSTRIAL ROBOT

(71) Applicant: Beckhoff Automation GmbH, Verl (DE)

(72) Inventors: Peter Kastler, Vienna (AT); Clemens Maier, Bludenz (AT); Thomas Morscher, Vienna (AT); Armin Pehlivan, Nüziders (AT); Christoph Zech, Mödling (AT)

(73) Assignee: Beckhoff Automation GmbH, Verl (DE)

( * ) Notice: Subject to any disclaimer, the term of this patent is extended or adjusted under 35 U.S.C. 154(b) by 0 days.

(21) Appl. No.: 17/881,303

(22) Filed: Aug. 4, 2022

(65) Prior Publication Data

US 2022/0410412 A1 Dec. 29, 2022

Related U.S. Application Data

(63) Continuation of application No. PCT/EP2021/052788, filed on Feb. 5, 2021.

(30) Foreign Application Priority Data

Feb. 6, 2020 (DE) ............ 10 2020 103 058.4

(51) Int. Cl.
*B25J 19/00* (2006.01)
*B25J 9/08* (2006.01)
*B25J 18/00* (2006.01)

(52) U.S. Cl.
CPC ............ *B25J 19/0054* (2013.01); *B25J 9/08* (2013.01); *B25J 18/00* (2013.01); *B25J 19/0075* (2013.01)

(58) Field of Classification Search
None
See application file for complete search history.

(56) References Cited

U.S. PATENT DOCUMENTS 4,611,377 A * 9/1986 McCormick ....... B23Q 3/15553
29/407.05
4,678,952 A * 7/1987 Peterson ............. B25J 19/0029
901/29

(Continued)

FOREIGN PATENT DOCUMENTS

CN 101861234 A 10/2010
CN 102380877 A 3/2012

(Continued)

OTHER PUBLICATIONS

Office Action dated Dec. 26, 2022 in connection with Chinese patent application No. 202180013200.9, 11 pages Including English translation.

(Continued)

*Primary Examiner* — Charles A Fox
*Assistant Examiner* — Gregory T Prather
(74) *Attorney, Agent, or Firm* — Dorsey & Whitney LLP

(57) ABSTRACT

An active arm module and modular robot arm for an industrial robot comprises a housing, a heat exchanger, a drive device, and a connecting side with a connecting plate. The connecting plate can be mechanically connected to a further arm module or to a robot base for transmitting drive and support forces. The housing defines an interior space for receiving the drive device. The heat exchanger accommodates the drive device at least in sections, and is thermally coupled to the drive device. The heat exchanger has a fluid channel and can exchange heat between the drive device and the fluid. The arm module comprises a fluid contact device arranged at the connecting plate. Fluid can be exchanged with the further arm module or robot base via the fluid (Continued)

contact device; e.g., the fluid channel can be filled with the fluid for exchanging the fluid with the first fluid contact device.

23 Claims, 23 Drawing Sheets

(56) References Cited

U.S. PATENT DOCUMENTS

| | | | |
|---|---|---|---|
| 6,731,091 | B2 | 5/2004 | Hietmann et al. |
| 7,464,622 | B2 | 12/2008 | Markert et al. |
| 10,265,869 | B2 | 4/2019 | Lohmeier et al. |
| 10,464,082 | B2 | 11/2019 | Imle |
| 11,161,258 | B2 | 11/2021 | Boyland et al. |
| 2010/0314376 | A1 | 12/2010 | Zander et al. |
| 2012/0048051 | A1 | 3/2012 | Long |
| 2013/0071218 | A1 | 3/2013 | Hosek et al. |
| 2018/0111275 | A1 | 4/2018 | Kurek |
| 2018/0170169 | A1 | 6/2018 | Lee et al. |
| 2022/0143815 | A1 | 5/2022 | Kastler et al. |

FOREIGN PATENT DOCUMENTS

| | | |
|---|---|---|
| CN | 104411266 A | 3/2015 |
| DE | 4033331 A1 | 4/1991 |
| DE | 10033224 C1 | 12/2001 |
| DE | 10357609 A1 | 7/2005 |
| DE | 202007016161 U1 | 3/2009 |
| DE | 102015009214 A1 | 1/2017 |
| DE | 102016004847 A1 | 10/2017 |
| DE | 102020101473 A1 | 7/2020 |
| DE | 102019120128 A1 | 1/2021 |
| EP | 3348362 A1 | 7/2018 |
| KR | 20170134826 A | 12/2017 |

OTHER PUBLICATIONS

International Preliminary Report on Patentability dated Jan. 26, 2022 in connection with International Patent Application No. PCT/EP2021/052788, 125 pages including English translation.
Office Action dated Feb. 6, 2020 in connection with German patent application No. 10 2020 103 058.4, 11 pages including English translation.
International Search Report and Written Opinion dated May 14, 2021 in connection with International Patent Application No. PCT/EP2021/052788, 16 pages including English translation.
Full English Translation of German Patent Publication No. DE4033331A1.
Full English Translation of German Patent No. DE10033224C1.
Full English Translation of German Patent Publication No. DE10357609A1.
Full English Translation of German Patent No. DE202007016161U1.
Full English Translation of German Patent Publication No. DE102015009214A1.
Full English Translation of German Patent Publication No. DE102016004847A1.

* cited by examiner

Fig. 18 D-D

ARM MODULE, ROBOT ARM AND INDUSTRIAL ROBOT

CROSS-REFERENCE TO RELATED APPLICATIONS

This patent application is a continuation of International Patent Application No. PCT/EP2020/052788, filed Feb. 5, 2021, entitled "Arm Module, Robot Arm and Industrial Robot," which claims the priority of German patent application DE 10 2020 103 058.4, filed Feb. 6, 2020 entitled "Armmodul, Roboterarm and Industrieroboter," the disclosure content of each of which is incorporated by reference herein, in the entirety and for all purposes.

FIELD

The present invention relates to an active arm module, a robot arm and an industrial robot.

BACKGROUND

The technical discipline of automation technology has the task of automating machines incl. industrial robots and/or systems, i.e. to be able to operate them independently and without the assistance of a human being. A degree of automation in an automation system is the higher, the more independent a respective machine in a system and/or a respective system is/are from human intervention.

Aims of automation technology are a relief of the human being from dangerous, strenuous and/or monotonous activities, an improvement of a quality of the produced goods by the technical system, a higher efficiency of the system and a cost reduction by the system. General advances in machines, in signal acquisition, signal processing and/or a communication of components within the automation system may significantly increase the degree of automation of an existing or a new system when compared to the state of the art.

Application-specific industrial robots are an integral part of such automated systems. An industrial robot is a programmable machine for handling, assembling and/or processing workpieces. The industrial robot generally comprises a robot base, a robot arm with a plurality of proximal and distal arm links that may be pivoted and/or rotated relative to each other, an end effector, a local controller/regulator, and possibly a global controller/regulator. Industrial robots are often equipped with various sensors. When programmed, the industrial robot is capable of autonomously performing a workflow or varying an execution of a task depending on information from a sensor.

For example, US 2018/0111275 A1 discloses a modular robot arm. The modular robot arm comprises a set of modular robot components that are connected to each other. To connect the modular robot components to each other, a ring section is provided in each case. In this embodiment, high forces act on the connection between the two robot components.

For example, US 2018/0111275 A1 discloses a modular robot arm. The modular robot arm comprises a set of modular robot components that are connected to each other. In order to connect the modular robot components to each other, a ring section is provided in each case. In this embodiment, high forces act on the connection between the two robot components.

Furthermore, a robot cooling system for cooling a robot is known from DE 10 2016 004 847 A1. The robot comprises a drive motor that serves as a heat source and is to be cooled, a robot gear or an electrically operated application component, and a primary cooling circuit in which a primary coolant circulates to cool the drive motor. Furthermore, the robot comprises a secondary cooling circuit in which a secondary coolant flows, the secondary cooling system dissipating heat from the primary cooling circuit.

DE 10 2015 009 214 A1 discloses a coating system for coating components, in particular motor vehicle body components, with a coating agent. The coating system has a first coating system component, which in operation produces waste heat as a by-product and forms a heat source, and a second coating system component, which is heated in operation and forms a heat sink. The waste heat from the first coating system component is supplied to the second coating system component for heating.

DE 20 2007 016 161 U1 describes a robot holding device for fixing a fluid-cooled joining tool to a robot arm of a joining robot so that it may rotate about a longitudinal axis.

DE 103 57 609 A1 describes a multi-axis industrial robot, in particular for use in environments at risk of contamination, with a number of rinsing chambers in the area of drive devices of the handling device which may be supplied with a rinsing medium.

DE 100 33 224 C1 describes a robot with distributed drive electronics, servo amplifiers and inverters, each drive electronics being thermally insulated from the robot structure and provided with a cooling device.

An industrial robot is known from DE 40 33 331 A1. The industrial robot comprises a robot body having a plurality of motor compartments for accommodating electric motors and having a plurality of electric motors for driving the robot body, each motor being accommodated in one of the plurality of motor compartments. Furthermore, the industrial robot comprises a plurality of guide channels for introducing an inert gas into the plurality of motor compartments and a plurality of exhaust channels for exhausting the inert gas. Each outlet channel is formed in one of the plurality of engine compartments. Further, the industrial robot comprises gas supply devices for supplying an inert gas into the plurality of guide channels at a predetermined pressure, the predetermined pressure being higher than an ambient pressure.

Furthermore, U.S. Pat. No. 4,678,952 A discloses a sealed-off joint having two adjacent, axially aligned sockets separated by a rotating seal, wherein a joint may be moved with regard to the other. The joints comprise a tube-shaped feedthrough which is surrounded by a motor and by a harmonic drive. A rev counter and a brake serve to control the motor, and a position sensor measures the rotational movement between the sockets. All components are assembled to be sealed-off with regard to the outside of the sockets. A sealable aperture is in connection with the interior of the tube-shaped feedthrough for each socket, so that control cables and liquid lines may be guided through an aperture into the connection, along the tube-shaped feedthrough and out of the other aperture.

SUMMARY

The invention provides a particularly powerful, compact and lightweight active arm module for a modular robot arm.

According to one aspect of the in invention the active arm module for a modular robot arm of an industrial robot comprises a first housing, a heat exchanger, a drive device, and a first connecting side comprising a first connecting plate, wherein the first connecting plate may be mechanically connected to a further arm module or a robot base of the robot arm for transmitting drive and support forces, wherein the first housing extends along an axis of rotation and defines an interior space receiving the drive device, wherein the heat exchanger accommodates the drive device at least in sections and is thermally coupled to the drive device, wherein the heat exchanger comprises at least a heat exchanger fluid channel, wherein the heat exchanger is embodied to exchange heat between the drive device and the fluid. A first fluid contact device is arranged at the first connecting plate, wherein a fluid may be exchanged with the further arm module or the robot base via the first fluid contact device, wherein the heat exchanger fluid channel may be filled with the fluid for exchanging the fluid with the first fluid contact device.

EXAMPLES

It has been recognized that an improved active arm module may be provided by the active arm module having a first housing, a heat exchanger, a drive device, a first connecting side having a first connecting plate, and a first fluid contact device disposed on the first connecting plate. The first connecting plate is mechanically connectable to another arm module of the robot arm or to a robot base of the robot arm for transmitting drive and support forces. The first housing extends along an axis of rotation and defines an interior space accommodating the drive device, wherein a fluid is exchangeable with the further arm module or the robot base via the first fluid contact device. The heat exchanger accommodates the drive device at least in sections and is thermally coupled to the drive device, the heat exchanger having at least one heat exchanger fluid channel. The heat exchanger fluid channel may be filled with the fluid for exchanging the fluid by the first fluid contact device. The heat exchanger is embodied to exchange heat between the drive device and the fluid.

This embodiment has the advantage that thermal overheating of the drive device is avoided by cooling the drive device with the fluid via the heat exchanger. This keeps thermal overloading of the drive device to a minimum, so that the drive device and thus also the active arm module have a particularly long service life. Furthermore, a permanently high thermal load, in particular on permanent magnets of the rotor of the drive device, is kept low. In particular, this avoids a reorientation of the magnetic domains of the permanent magnets of the rotor, which occurs especially at high temperatures. High dissipation may also be dissipated by cooling, so that the drive module is particularly temperature-stable.

The active arm module may be embodied both within an industrial robot, and as an end effector of the industrial robot.

In another embodiment, the arm module comprises a second connecting side, wherein the second connecting side is mechanically connected to the first housing in a torque-proof manner. The second connecting side comprises a second fluid contact device, wherein the heat exchanger fluid channel of the heat exchanger is arranged between the second fluid contact device and the first fluid contact device, and the heat exchanger fluid channel is embodied to exchange fluid between the first fluid contact device and the second fluid contact device. By arranging the heat exchanger between the first fluid contact device and the second fluid contact device, no additional fluid is required to cool the drive device, but the fluid exchanged between the first and second connecting sides may be used. This allows the active arm module to be kept particularly compact.

In a further embodiment, the heat exchanger fluid channel in the heat exchanger is embodied to meander around the drive device. In addition or alternatively, the heat exchanger fluid channel is at least in sections formed helically in at least one winding, preferably at least in two windings around the axis of rotation, running around the drive device. This embodiment has the advantage that a uniform heat exchange between the fluid and the drive device is ensured and, furthermore, local overheating of the drive device may be prevented by the uniform cooling.

In another embodiment, the active arm module comprises a rotation transmitter, wherein the first connecting side is rotatably supported about the axis of rotation. The rotation transmitter connects the first fluid contact device with the heat exchanger fluid channel, wherein the rotation transmitter is embodied to exchange the fluid between the heat exchanger fluid channel of the heat exchanger and the first fluid contact device during a rotation of the first connecting side. This ensures a substantially unlimited rotatability of the first connecting side relative to the first housing on the one hand and a sufficient fluid supply of the heat exchanger with fluid on the other hand.

In another embodiment, the drive device comprises a rotor and a stator, wherein the rotor is coupled to the first connecting side in a torque-locking manner and is configured to rotate the first connecting side about the axis of rotation. The heat exchanger at least partially receives the stator. The heat exchanger additionally abuts the stator at least in sections. This ensures uniform cooling of the stator during operation of the active arm module by the heat exchanger, so that local overheating of the stator, in particular of individual windings or winding sections of the stator, may be prevented. It is of particular advantage in this context if the drive device is embodied as a brushless motor, in particular as a brushless DC motor. It is of particular advantage if the drive device is embodied as an internal rotor.

In a further embodiment, the heat exchanger comprises at least a first heat exchanger section, the first heat exchanger section being embodied to run hollow-cylindrically around the axis of rotation. Furthermore, the first heat exchanger section is thermally connected to the drive device and surrounds the drive device radially on the outside. The first heat exchanger section at least in sections forms the heat exchanger fluid channel. Furthermore, the first heat exchanger section is embodied to exchange heat between the fluid and the drive device.

This embodiment has the advantage that the heat exchanger and the first housing may be manufactured particularly quickly and easily in a casting process. Furthermore, it is advantageous in this context if the heat exchanger comprises a conductive material, in particular an aluminum material. Furthermore, the first heat exchanger section may be embodied in one piece and materially uniform with the first housing, or a two-part embodiment of the first housing and of the first heat exchanger section is possible.

In a further embodiment, the heat exchanger fluid channel has a second channel section. The second channel section is groove-shaped and guided around the axis of rotation. The second channel section is arranged on a second outer circumferential side of the heat exchanger, in particular of the first heat exchanger section. The first housing comprises a heat exchanger receptacle on a third inner circumferential side, the heat exchanger engaging in the heat exchanger receptacle at least in sections. The third inner circumferential side of the heat exchanger receptacle externally delimits the second channel section. As a result, the second channel section may be produced and sealed in a particularly simple manner. Alternatively, the second channel section is arranged on a first heat exchanger front face of the heat exchanger, in particular of the first heat exchanger section, the second channel section being of arcuate embodiment, running around the axis of rotation. This embodiment has the advantage that the second channel section may be introduced into the first heat exchanger section in a simple chip-removing process by a finger cutter or a groove cutter. Alternatively, a casting mold may be used to form the second channel section in the casting of the first heat exchanger section.

The two-part embodiment of the heat exchanger allows for particularly simple and cost-effective production. In particular, e.g. the heat exchanger may be manufactured particularly simply and inexpensively by a combination of a casting and a chip-removing process.

Advantageously, the second heat exchanger section and a third housing of the rotation transmitter are formed in one piece and of the same material.

In a further embodiment, the heat exchanger abuts the rotation transmitter and the heat exchanger fluid channel comprises a first channel section. The first channel section extends along a direction of the axis of rotation and is embodied to extend in a bore-like manner at a distance from the axis of rotation. The first channel section opens into the second channel section on one side and is connected to the rotation transmitter on another side. The first channel section is embodied for exchanging the fluid between the rotation transmitter and the second channel section.

It is of particular advantage, for example, if the first channel section is embodied as a through opening, in particular as a bore.

In a further embodiment, the heat exchanger comprises a second heat exchanger section, the second heat exchanger section being of hollow cylindrical embodiment extending around the axis of rotation. The second heat exchanger section is connected to a third housing of the rotation transmitter, wherein the first heat exchanger section abuts a fourth heat exchanger front face of the second heat exchanger section at a third heat exchanger front face facing away from the first connecting side. The first channel section is guided through the second heat exchanger section. This embodiment has the advantage that the heat exchanger may be manufactured particularly simply and inexpensively.

In a further embodiment, the heat exchanger comprises a second heat exchanger section arranged axially next to the first heat exchanger section. The second heat exchanger section is embodied to extend hollow-cylindrically around the axis of rotation. The heat exchanger fluid channel is arranged alternately in the first heat exchanger section and the second heat exchanger section. The second heat exchanger section abuts the first heat exchanger section at the front face and is thermally connected to the first heat exchanger section. Preferably, the second heat exchanger section and a third housing of the rotation transmitter are formed integrally and of the same material. As a result, the heat exchanger fluid channel is particularly long and the fluid guided in the heat exchanger fluid channel may exchange a particularly large amount of heat with the heat exchanger.

In a further embodiment, the active arm module has a first fluid line that is embodied in a bore-like manner in the first housing. The first fluid line extends in sections in the radial direction to the axis of rotation and opens into the heat exchanger fluid channel on the inside. Radially outwardly, the first fluid line is connected to the second fluid contact device. The first fluid line is configured to exchange fluid between the second channel section and the heat exchanger fluid channel. This embodiment has the advantage that tube lines may be dispensed with in the active arm module, thereby making the active arm module particularly easy to assemble.

In a further embodiment, the active arm module comprises a conduit block with at least one second fluid line, the second fluid line being embodied in the conduit block in the form of a channel, in particular in the form of a hole. On a side of the conduit block facing the second connecting side, a sixth fluid contact of the second fluid contact device is attached to the conduit block. At a side of the conduit block facing away from the second connecting side, the conduit block abuts on the rotation transmitter. The second fluid line is configured to exchange fluid between the rotation transmitter and the second fluid contact device. This embodiment has the advantage that further tube lines may be dispensed with in the active arm module, thereby making the active arm module particularly easy to assemble. Furthermore, leaks at the tube line are avoided.

In a further embodiment, the first housing comprises a first shoulder extending inwardly in a radial direction with respect to the axis of rotation and having a first shoulder surface arranged on the face of the first shoulder. The first shoulder surface is arranged in an inclined manner with regard to the axis of rotation. The heat exchanger has a second shoulder surface on a side facing the first connecting side, a first sealing element, in particular a first sealing ring, being arranged at least in sections between the first shoulder surface and the second shoulder surface. The first sealing element is in contact with the first shoulder surface and is embodied to seal the heat exchanger fluid channel against an outlet of the fluid. This embodiment has the advantage that a first sealing plane of the active arm module is formed in a particularly simple manner.

In a further embodiment, the first housing comprises a second recess formed circumferentially around the axis of rotation. Furthermore, the heat exchanger comprises a third shoulder formed circumferentially around the axis of rotation, which extends radially outwards with regard to the axis of rotation and has a third shoulder set surface on a side facing the first connecting side, which is aligned in an inclined manner with regard to the axis of rotation. The third shoulder at least in sections engages in the second recess. A second sealing groove is arranged in the third shoulder surface or in the second recess. A second sealing element, in particular a second sealing ring, is arranged in the second sealing groove. The second heat exchanger fluid channel is at least in sections arranged axially between the heat exchanger front face and the third recess. The second sealing element is embodied to seal the heat exchanger against fluid escaping from the heat exchanger fluid channel. This makes it particularly easy to seal the heat exchanger.

In a further embodiment, the heat exchanger fluid channel comprises at least one third channel section, wherein the third channel section extends along a direction of the axis of rotation and is embodied to extend at a distance from the axis of rotation. The third channel section is circumferentially offset from the first channel section. The second channel section connects the first channel section to the third channel section.

In a further embodiment, the heat exchanger fluid channel comprises at least a fourth channel section, the fourth channel section being arranged on a second heat exchanger front face of the rotation transmitter in the rotation transmitter and having a groove-shaped embodiment. The fourth channel section is embodied to extend around the axis of rotation. The third channel section opens at the fourth channel section. The first heat exchanger section lies against the second heat exchanger front face and closes the fourth channel section. This embodiment has the advantage that the fourth channel section may be introduced into the second heat exchanger section particularly easily by a chip-removing process. The fourth channel section may also be formed in the second heat exchanger section by a casting mold.

In a further embodiment, the active arm module has a gear device, the gear device being connected to the drive device on the input side in a torque-proof manner and to the first connecting side on the output side in a torque-proof manner. The gear device abuts on the front face of the heat exchanger and closes the second channel section. As a result, the active arm module is particularly compact in the axial direction. In addition, a seal may be arranged between the gear and the first heat exchanger front face for fluid-tight sealing of the second channel section. The seal may e.g. be a cured liquid seal.

In another embodiment, the rotation transmitter has a first connection and a first pickup channel extending in a groove shape about the axis of rotation, the heat exchanger fluid channel connecting the first connection to the first pickup channel for exchanging fluid between the first pickup channel and the first connection. The first connection is fluidically connected to the second fluid contact device by a first fluid line. The first connection is fluidically connected to the second fluid contact device. This embodiment has the advantage that additional channels and/or lines, in particular tube lines, may be dispensed with, so that a component count is particularly low.

A particularly advantageous robot arm may be provided by the robot arm having an active arm module and an arm module or robot base, the active arm module being embodied as described above. The arm module comprises at least a second connecting side, wherein the first connecting side of the active arm module is mechanically connected to the second connecting side of the arm module or robot base for transmitting support forces and/or drive forces between the active arm module and the arm module. A fluid may be exchanged via the interconnected first and second connecting sides of the active arm module and the arm module or robot base. This eliminates the need for additional line routing, particularly on the outside of the first housing of the active arm module. This e.g. prevents the end effector from snagging on the robot arm.

A particularly temperature-stable and precise industrial robot, which is particularly suitable for pick-and-place tasks, may be provided by the industrial robot having a robot arm described above and a robot base. The first connecting side of the arm module faces the robot base, wherein fluid may be transferred between the robot base and the active arm module via the first connecting side of the arm module, the second connecting side of the arm module and the first connecting side of the active arm module.

BRIEF DESCRIPTION OF THE DRAWINGS

The invention will be discussed in more detail below on the basis of the figures. Here, in a schematic illustration in each case.

DETAILED DESCRIPTION

Figure 1:
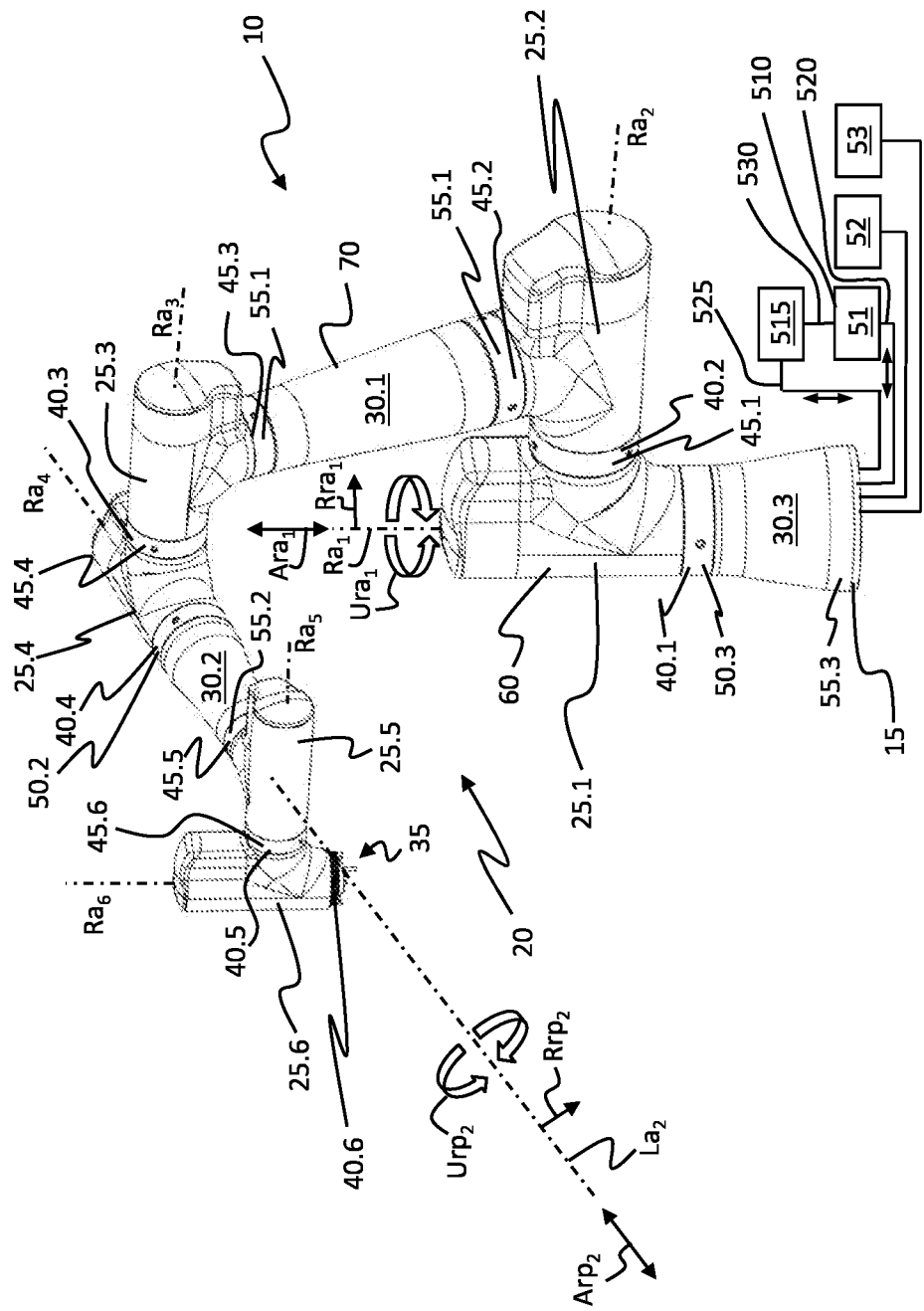
FIG. 1 is a perspective view of an industrial robot for an automation system.

FIG. 1 shows a perspective view of an industrial robot 10 for an automation system.

The industrial robot 10 is an (automatic) machine with several degrees of freedom (e.g. six rotational degrees of freedom in FIG. 1) for automation technology, which may perform various functions in a working environment in (conditional) autonomous performance by a pre-programmed control/regulation. The industrial robot 10 comprises a robot base 15, a robot arm 20 and a, preferably interchangeable, end effector, also referred to as a robot hand, with e.g.: a tool, a gripper, etc., which is arranged at a free end of the robot arm 20.

In particular, the present robot arm 20 of the industrial robot 10 is modularly embodied from a modular kit with a plurality of arm modules 18. The arm modules 18 may e.g. be constructed as an active arm module 25 or as a passive arm module 30 or as an end effector. The modular system may further comprise other (arm and/or end) modules. In principle, the structure of the robot arm 20 with active arm modules 25 and passive arm modules 30 may be selected as desired and is only limited with respect to a maximum load-bearing capacity of the arm modules 18.

In FIG. 1, the active arm modules 25 are numbered, with numbering starting from the robot base 15 toward the end effector. The passive arm modules 30, too, are also numbered to help distinguish them. For example, a third passive arm module 30.3 is connected to the robot base 15 at one end and to a first active arm module 25.1 at another end. The first active arm module 25.1 is connected at its second end to a second active arm module 25.2. A first passive arm module 30.1 is arranged between the second active arm module 25.2 and a third active arm module 25.3. The third active arm module 25.3 is connected to a fourth active arm module 25.4 on a side facing away from the first passive arm module 30.1, which is connected to a second passive arm module 30.2 on a side facing away from the third active arm module 25.3. The second passive arm module 30.2 is connected to a fifth active arm module 25.5. A sixth active arm module 25.6 is arranged on the side facing away from the second passive arm module 30.2, on which the end effector is arranged on a first connecting side 40.6 facing away from the fifth active arm module 25.5. The first connecting side 40.6 of the sixth active arm module 25.6 thus forms an end effector connecting side 35 to which the end effector may be connected.

The active arm modules 25 each have a drive device by which a further active arm module 25 or a passive arm module 30 that may be connected thereto may be rotated about an assigned axis of rotation $Ra_n$ of the active arm module 25.

Similarly, the passive arm modules 30 do without the drive device. They are therefore embodied as a kind of extension part.

Depending on a number of active arm modules 25, the robot arm 20 also comprises a corresponding number of rotational axes $Ra_n$. That is, preferably any number of complete rotations of a respective active arm module 25 of the robot arm 20 may be performed in preferably both circumferential directions $Ura_n$ of a respective rotational axis $Ra_n$.

Furthermore, the following description refers to a polar coordinate system of a respective active arm module 25. The polar coordinate system has a respective rotational axis $Ra_n$ referring to the general case and not to a specific active arm module 25. An axial direction $Ara_n$ of the active arm module 25 extends along the rotational axis $Ra_n$. A radial direction $Rra_n$ of the respective active arm module 25 extends perpendicularly outwardly with respect to the respective rotational axis $Ra_n$. A circumferential direction $Ura_n$ of the respective active arm module 25 extends on a (circular) path around the rotational axis $Ra_n$ of the active arm module 25. The general nomenclature is used to explain the structure of the active arm module 25 in general.

Specifically, in FIG. 1 the rotational axes $Ra_n$ denote the axial directions $Ara_n$ and the circumferential directions $Ura_n$ of the respective active arm module 25 are indicated according to their numbering. For example, a first rotational axis $Ra_n$ of the first active arm module 25.1 bears the index 1 as the index at the position of n. A second rotational axis $Ra_2$ of the second active arm module 25.2 is labeled accordingly in FIG. 1. Similarly, the axial directions $Ara_n$, the radial directions $Rra_n$ and the circumferential directions $Ura_n$ of the active arm modules 25 are labeled accordingly. In FIG. 1, for reasons of clarity, only all directional indications (the first rotational axis $Ra_1$, the first axial direction $Ara_1$ and the first circumferential direction $Ura_1$) for the first active arm module 25.1 are shown.

Furthermore, the description below refers to a further polar coordinate system of a respective passive arm module 30. The further polar coordinate system has a respective longitudinal axis $La_n$. Along the longitudinal axis $La_n$ runs an axial direction $Arp_n$ of the respective passive arm module 30.

A respective rotational axis $Ra_n$ of the active arm module 25 is preferably associated with a force and/or torque sensor as well as, as the case may be, a first and/or second sensor device of a respective active arm module 25, via which a force and/or a torque on the active arm module 25 as well as a position of the active arm module 25 relative to the rotational axis $Ra_n$ may be detected. The rotational axis $Ra_n$ is exemplarily embodied as an ideal "joint" (rotational joint, pivot joint and/or swivel joint) of the multi-unit or preferably modular robot arm 20, e.g. with respect to the robot base 15.

For the respective rotational axis $Ra_n$, a force-, torque and/or position sensor may be provided for monitoring forces and/or torques occurring on the robot arm 20 and/or a relative position of the arm modules 18 with respect to each other. This may also be limited to a section of the robot arm 20.

A certain modular system for a robot arm 20 has at least one type of active arm module 25, e.g. having a I-, J-, L- or T-shape, and preferably at least one type of passive arm module 30, e.g. having a I-, J-, L- or T-shape. In FIG. 1, for example, the active arm modules 25 are J-shaped or L-shaped, while the passive arm modules 30 are e.g. I-shaped.

In FIG. 1, all arm modules 18 of the modular system for robot arms 20 are preferably embodied in such a way that each of the arm modules 18 has at least two first, second, third and/or fourth connecting sides 40, 45, 50, 55. The first to fourth connecting sides 40, 45, 50, 55 of the arm modules 18 may correspond to one another and be connected to one another. In this regard, by way of example, each active arm module 25 has a first connecting side 40 and a second connecting side 45. Each passive arm module 30 comprises a third connecting side 50 and a fourth connecting side 55. However, it is also possible for each active arm module 25 to have two first connecting sides 40 or two second connecting sides 45. Similarly, it is also possible for each passive arm module 30 to have two third connecting sides 50 or two fourth connecting sides 55.

For clear identification of the respective first to fourth connecting sides 40, 45, 50, 55, the assignment of the first to fourth connecting sides 40, 45, 50, 55 corresponds to the numbering of the active arm modules 25 or the passive arm modules 30. Thus, the first connecting side of the first active arm module 25.1 is indicated by the reference numeral 40.1 in FIG. 1.

The first connecting side 40, the second connecting side 45, the third connecting sides 50 and the fourth connecting sides 55 are embodied to correspond to one another. That is, a second connecting side 45 of another active arm module 25 or a third connecting side 50 of a passive arm module 30 would be connectable to each first connecting side 40 of an active arm module 25. Similarly, a first connecting side 40 of another active arm module 25 or a fourth connecting side 55 of a passive arm module 30 would be connectable to each second connecting side 45 of an active arm module 25.

In FIG. 1, the fourth connecting side 55.3 of the third passive arm module 30.3 is connected to the robot base 15 as an example. In addition to the mechanical connection of the fourth connecting side 55.3 of the third passive arm module 30.3 for supporting forces and torques from the robot arm 20 on the robot base 15, the robot arm 20 is supplied with a fluid 51 via the fourth connecting side 55.3 of the third passive arm module 30.3, which is introduced into the robot arm 20 via the fourth connecting side 55.3 of the third passive arm module 30.3.

The fluid 51 has a first low temperature T1 when introduced. The first temperature T1 may e.g. be 20° C. The fluid 51 may also be pre-cooled and e.g. have the first temperature T1=4° C. Alternatively, the fluid 51 may be heated and have the first temperature of 60° C.

Furthermore, the robot base 15 may on the input side be connected to a fluid reservoir 510 via a first fluidic supply line 520. The fluid reservoir 510 is embodied to store the fluid 51 and may e.g. embodied as a tank or pressure reservoir.

Further, the robot base 15 may on the output side be connected to an input side of a feed pump 515 via a second fluidic supply line 525. A third fluidic supply line 530 may connect an output side of the feed pump 515 to the fluid reservoir 510.

Unless separately explained, during operation of the feed pump 515, the feed pump 515 draws in fluid 51 and creates a vacuum at the robot base 15. The drawn-in fluid 51 is returned to the fluid reservoir 510 via the third fluidic supply line 530. Fluid 51 may flow from fluid reservoir 510 to robot base 15 via first fluidic supply line 520. The flow of fluid 51 within the industrial robot 10 will be discussed in detail within the context of FIGS. 10 through 14.

In a further embodiment of the industrial robot 10 shown, the fluid 51 may be supplied to the robot base 15 under pressure and e.g. have a pressure of two bar to two hundred bar when supplied to the robot base 15. In this regard, the feed pump 515 may be connected to the robot base 15 on the output side and to the fluid reservoir 510 on the input side. Instead of the embodiment described above, the feed pump 515 pumps the fluid 51 to the robot base 30. Also, the fluid 51 may be stored in a pressurized state in the fluid reservoir 510, so that the feed pump 515 between the robot base 15 and the fluid reservoir 515 may be dispensed with.

Since, as described above, the fluid 51 may flow or be sucked or pumped in different flow directions in the first to third fluidic supply lines 520, 525, 530 according to the previous description, depending on the embodiment of the industrial robot 10, the flow direction of the fluid 51 is shown by double arrows. The same applies accordingly to the flow direction of the fluid 51 in the further FIGS. Even if it is only described for the individual embodiments of the industrial robot 10 that the fluid 51 flows or is conveyed or is sucked in one direction, it is also disclosed without explicit description that the fluid 51 may of course also flow or be conveyed or be sucked in the opposite direction. This is also shown in the individual figures by double arrows.

Furthermore, via the fourth connecting side 55.3 of the third passive arm module 30.3, the robot arm 20 is in terms of power electrically connected to an electrical power source 52 and, in terms of data, connected to a data network 53.

A second connecting side 45.1 of the first active arm module 25.1 is connected to a first connecting side 40.2 of the second active arm module 25.2. The first passive arm module 30.1 is arranged between a second connecting side 45.2 of the second active arm module 25.2 and a second connecting side 45.3 of the third active arm module 25.3, wherein a fourth connecting side 55.1 of the first passive arm module 30.1 is connected to the second connecting side 45.2 of the second active arm module 25.2 at one end, and at the other end a further fourth connecting side 55.1 of the first passive arm module 30.1 is connected to a second connecting side 45.3 of the third active arm module 25.3. In the embodiment, both connecting sides of the first passive arm module 30.1 are thus exemplarily embodied as fourth connecting sides 55.1 of the first passive arm module 30.1 and thus corresponding and/or complementary to the second connecting side 45.2 of the second active arm module 25.2 and the second connecting side 45.3 of the third active arm module 25.3. As a result, the second connecting side 45.2 of the second active arm module 25.2 may be arranged at a distance from the second connecting side 45.3 of the third active arm module 25.3 in a simple manner, and a predefined embodiment of the robot arm 20 may be implemented in a simple manner. By way of example, in FIG. 1 a first connecting side 40.3 of the third active arm module 25.3 is connected to a second connecting side 45.4 of a fourth active arm module 25.4.

A second passive arm module 30.2 is exemplarily embodied differently to the first passive arm module 30.1 in the modular system. In the axial direction of the second passive arm module 30.2, the second passive arm module 30.2 is embodied shorter than the first passive arm module 30.1. Furthermore, a third connecting side 50.2 of the second passive arm module 30.2 is embodied identically to the second connecting side 45.4 of the fourth active arm module 25.4 and a fourth connecting side 55.2 of the second passive arm module 30.2 is embodied correspondingly and/or complementarily to the second connecting side 45.5 of the fifth active arm module 25.5 and thus identically to the first connecting side 40.5 of the fifth active arm module 25.5. Thus, in contrast to the first passive arm module 30.1, the second passive arm module 30.2 has at its ends the third connecting side 50.2 and the fourth connecting side 55.2 of the second passive arm module 30.2, respectively, which are different from each other.

At the first connecting side 40.5 of the fifth active arm module 25.5, the fifth active arm module 25.5 is connected to a second connecting side 45.6 of the sixth active arm module 25.6. A first connecting side 40.6 of the sixth active arm module 25.6 is connected to the end effector.

Via the arm modules 18 and their first to fourth connecting sides 40, 45, 50, 55, the end effector is supplied with the fluid 51 as described in further detail and is electrically connected to the electrical power source 52 and data-connected to the data network 53. Similarly, the active and passive arm modules 25, 30 are data-connected to the data network 53, e.g. to a field bus or to an EtherCAT network, and electrically connected to the electrical power source 52 via their first to fourth connecting sides 40, 45, 50, 55.

Each of the active arm modules 25 comprises a first housing 60, each of the first housings 60 internally defining a first housing interior 65. A first connecting side 40 is disposed at one end of each of the first housings 60. The first connecting side 40 is rotatably mounted about the axis of rotation $Ra_n$ relative to the first housing 60 and is controllably driven by the drive device of the respective active arm module 25. The second connecting side 45 is e.g. inclined, preferably aligned perpendicularly with respect to the first connecting side 40, and is connected to the first housing 60 in a torque-proof manner. In the first housing interior 65, fluidic, electrical and data connections are arranged for the first connecting side 40 to the second connecting side 45, which will be discussed in detail later. In this context, fluidic connection is broadly understood to mean embodied for transporting and/or guiding and/or exchanging the fluid 51.

When the drive device of the active arm module 25 is activated, the drive device rotates the first connecting side 40 relative to the first housing 60. Depending on the embodiment of the robot arm 20, the drive device thus pivots the active arm module 25, with the exception of its own first connecting side 40, about the associated axis of rotation $Ra_n$, or only the first connecting side 40 about the associated axis of rotation $Ra_n$.

In FIG. 1, for example, the drive device of the first active arm module 25.1 pivots the first active arm module 25.1 and the arm modules 18 further attached to the second connecting side 45.1 of the first active arm module 25.1 and the end effector about the first axis of rotation $Ra_1$. By way of example, the sixth active arm module 25.6 is mounted in identical orientation with respect to the first active arm module 25.1. For example, the drive device of the sixth active arm module 25.6 drives the first connecting side 40.6 and rotates the end effector attached to the first connecting side 40.6 of the sixth active arm module 25.6. The first housing 60 and the second connecting side 45.6 of the sixth active arm module 25.6 are stationary.

In the case of the robot arm 20 shown in FIG. 1, the first axis of rotation $Ra_n$ is not restricted by way of example, i.e. the robot arm 10 may be permanently rotated in the same circumferential direction $Ura_1$. This means that the arm modules 18 shown in FIG. 1 may be used to form a robot arm 20 of any embodiment that may reproduce numerous common kinematics.

It is of course possible to embody the respective rotational axis $Ra_n$ as a pivot axis only, i.e. a movement of the respective active arm module 25 is limited to a certain angle, such as angles smaller than: 720°, 540°, 360°, 270°, 180°, 90° or 45°. For example, in FIG. 1, the second axis of rotation $Ra_2$ is preferably restricted to a predefined angle, such as 180°, to prevent the robot arm 20 from striking the robot base 15. Also, a constraint may be placed on the movement of the active arm modules 25 such that the arm modules 18 do not collide with one another. The restriction may be mechanical or control-related, in particular software-related.

The passive arm modules 30 each include a second housing 70, wherein the second housing 70 has a hollow embodiment and extends along the longitudinal axis $La_n$ in the axial direction $Arp_n$. In FIG. 1, by way of example, the second housing 70 is frustoconical in shape with a circular cross-section. The third connecting side 50 of the passive arm module 30 is connected to the second housing 70 in a torque-proof manner at one front face of the second housing 70, and is connected to the second housing 70 in a torque-proof manner. At another front end of the second housing 70, the fourth connecting side 55 of the passive arm module 30 is arranged and non-rotatably connected to the second housing 70. Thereby, due to the hollow embodiment of the second housing 70, the second housing 70 has a particularly high bending and torsional stiffness, so that the passive arm module 30 may transmit a high load.

In the modular system, the arm module 18 may have different sizes. In particular, the first or second housing 60, 70 may have different lengths and/or different cross-sectional areas of the first to fourth connecting sides 40, 45, 50, 55, so as to easily obtain a desired geometric configuration of the robot arm 20 when combining the arm modules 18 from the modular kit.

The modular system may be embodied in such a way that the arm modules 18 each belong to different assemblies that have different geometric embodiments but are functionally identical to one another.

In the embodiment, the first active arm module 25.1 and the second active arm module 25.2 are identically embodied and have the same geometric configuration in terms of structural design. In FIG. 1, the first active arm module 25.1 and the second active arm module 25.2 belong to a first assembly which geometrically has the largest embodiment and the largest extension.

The third active arm module 25.3 and the fourth active arm module 25.4 are geometrically smaller in embodiment than the first and second active arm modules 25.1, 25.2 so that moments and forces for the first and second active arm modules 25.1 and 25.2 are reduced. They belong to a second assembly. Similarly, the fifth active arm module 25.5 and the sixth active arm module 25.6 belong to a third assembly, which has the smallest embodiment. As the arm modules 18 belong to smaller assemblies with increasing distance from the robot base 15, the passive arm module 30 connected to the robot base 15, in the embodiment the third passive arm module 30.3, is relieved of mechanical load.

The above-described embodiment of the modular system has the advantage that a multi-axis robot arm 20 may be assembled in a simple manner by the individual active arm modules 25 and, as the case may be, at least one passive arm module 30, tailored individually to the requirements from the active or passive arm modules 25, 30 of the modular system.

By manufacturing the arm modules 18 independently of the robot arm 20, the industrial robot 10 shown in FIG. 1 may be assembled in a particularly short time (within a few minutes). Also, after completion of the industrial robot 10, the industrial robot 10 may be flexibly adapted and, as the case may be, expanded or reduced by further (arm) modules of the modular system for adapting the industrial robot 10 to a different task. For example, an existing robot arm having four rotational axes $Ra_n$ may be converted to the industrial robot 10 shown in FIG. 1, e.g. with two additional active arm modules 25 mounted (subsequently, if necessary) between the end effector and the existing arm modules 18.

Furthermore, the arrangement of lines, cables or other connection on the outside of the industrial robot 10 may be dispensed with due to the internal routing of the fluid 51, the electrical power and the data connection, so that unintentional damage to the industrial robot 10 may be avoided.

Figure 2:
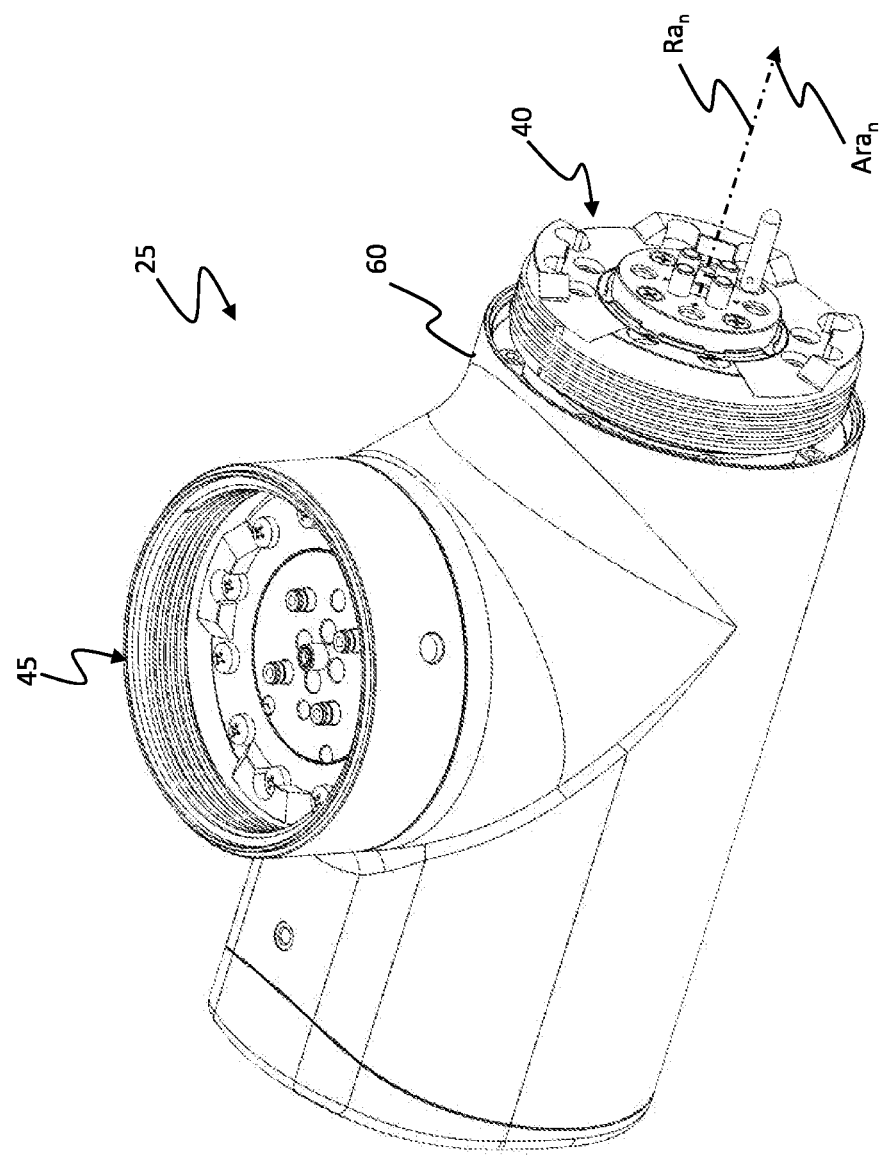
FIG. 2 is a perspective view of an active arm module shown in FIG. 1 according to a first embodiment.

FIG. 2 shows a perspective view of the active arm module 25 shown in FIG. 1 according to a first embodiment.

The active arm module 25 in each case has an identical embodiment even across the assemblies, although deviating therefrom only the geometric extensions of the individual active arm modules 25 have been changed. In other words, the active J-shaped active arm modules 25 of the different assemblies are scaled with respect to each other.

In the embodiment, the first connecting side 40 is arranged in a plane of rotation perpendicular to the axis of rotation $Ra_n$. The second connecting side 45 is arranged radially outwardly with regard to the axis of rotation $Ra_n$ and is inclined, preferably perpendicular, to the first connecting side 40.

Figure 3:
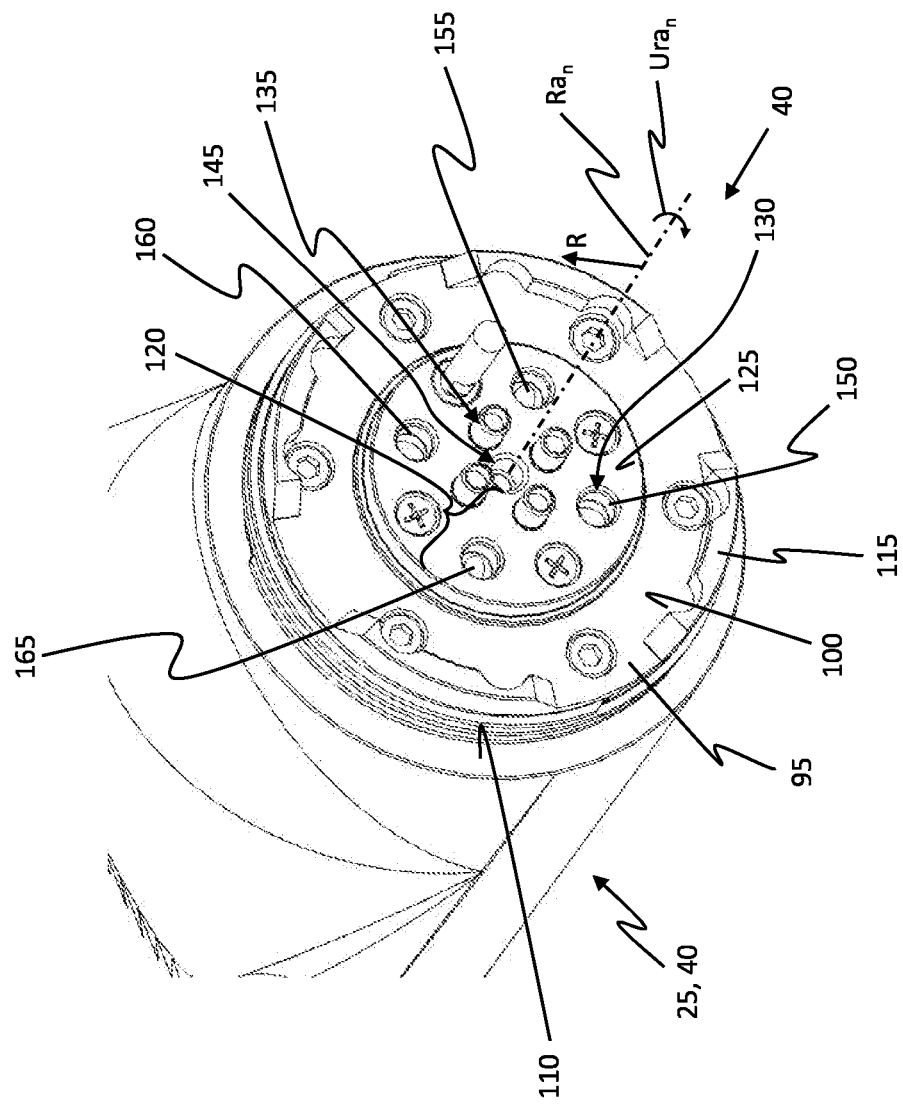
FIG. 3 is an enlarged perspective view of a first connecting side of the first active arm module shown in FIGS. 1 and 2.

FIG. 3 shows an enlarged perspective view of the first connecting side 40 of the active arm module 25 shown in FIGS. 1 and 2.

The first connecting side 40 has a connecting plate 95, wherein the connecting plate 95 extends substantially (in its main extension) in a plane of rotation perpendicular to the axis of rotation $Ra_n$. The connecting plate 95 has a first front face 100. The connecting plate 95 has an external thread 110. Radially outwardly adjacent to the external thread 110, a first face gearing 115 is arranged on the first front face 100, wherein the first face gearing 115 is e.g. embodied as a Hirth joint.

On the radially inner side, the connecting plate 95 has a connecting section 120. The connecting section 120 is spaced apart in the radial direction $Rra_n$ from the first face gearing 115. The connecting section 120 has a second front face 125, the second front face 125 being arranged in parallel to the first front face 100. On the rear side, the connecting section 120 abuts the first front face 100 and is mechanically connected to the connecting plate 95.

The first connecting side 40 comprises a first fluid contact device 130, a first power contact device 135, and a first contact device 145 for data connection at the connecting section 120.

The first fluid contact device 130 is arranged concentrically around the rotational axis $Ra_n$. The first power contact device 135 is arranged radially on the inside of the first fluid contact device 130. In the embodiment, the first fluid contact device 130 has a first fluid contact 150. The first fluid contact 150 is configured as a socket or female contact. In the exemplary embodiment, the first fluid contact device 130 also has second to fourth fluid contacts 155, 160, 165 in addition to the first fluid contact 150.

Each of the first through fourth fluid contacts 150, 155, 160, 165 is fluidically isolated from the other first through fourth fluid contacts 150, 155, 160, 165. This prevents fluid 51 from being exchanged between the first through fourth fluid contacts 150, 155, 160, 165. The first to fourth fluid contacts 150, 155, 160, 165 are embodied identically to each other by way of example. In the circumferential direction $Ura_n$, the first to fourth fluid contacts 150, 155, 160, 165 are arranged at an offset with regard to one another by 90°, by way of example, and have the same distance from the axis of rotation $Ra_n$, by way of example.

Figure 4:
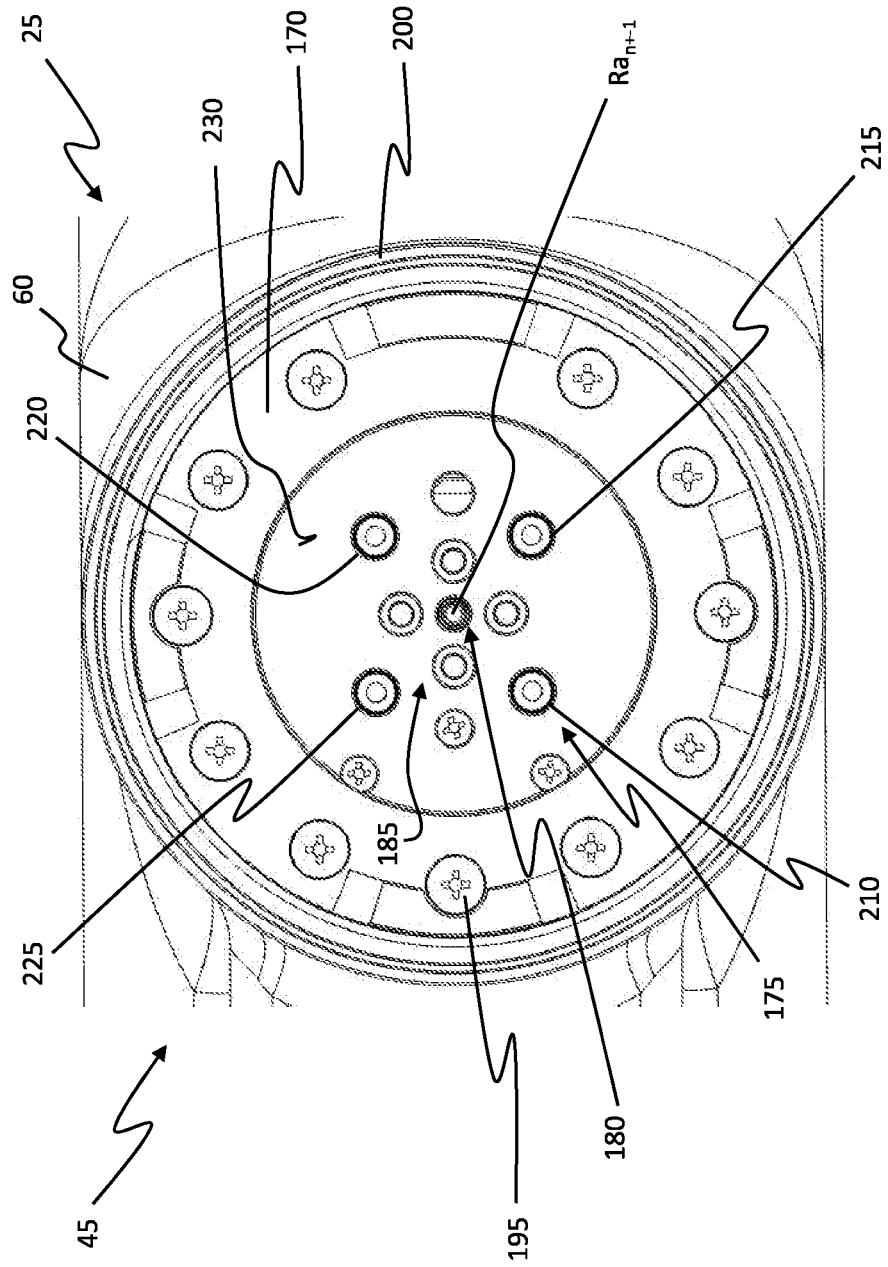
FIG. 4 is a top view of the second connecting side of the active arm module shown in FIGS. 1 to 3.

FIG. 4 shows a top view of the second connecting side 45 of the active arm module 25 shown in FIGS. 1 to 3.

The second connecting side 45 comprises a second connecting plate 170, a second fluid contact device 175, a second contact device 180, and a second power contact device 185.

By way of example, the second connecting plate 170 is oriented in parallel to the axis of rotation. The second connecting plate 170 has a substantially circular configuration in top view. Attached to the second connecting plate 170 are the second fluid contact device 175, the second contact device 180, and the second power contact device 185. The second fluid contact device 175, the second contact device 180 and the second power contact device 185 extend longitudinally or in parallel to a further axis of rotation $Ra_{n+-1}$, which is oriented perpendicularly to the axis of rotation. The second connecting plate 170 is connected to the first housing 60 in a torque-proof manner by a fastener 195, preferably a plurality of fasteners 195 arranged at an offset with regard to one another in the circumferential direction with respect to the further axis of rotation $Ra_{n+-1}$.

On the circumferential side, the second connecting plate 170 is embraced by a fastening ring 200 of the active arm module 25. The fastening ring 200 has an internal thread which is embodied to correspond or at least complement the external thread of the first connecting side 40. The fastening ring 200 is axially fixed with respect to the first housing 60. However, the fastening ring 200 may be rotated about the further axis of rotation $Ra_{n+-1}$ relative to the first housing 60.

The second fluid contact device 175 comprises a fifth fluid contact 210. Additionally, the second fluid contact device 175 may have a sixth to eighth fluid contact 215, 220, 225 in addition to the fifth fluid contact 210. Thus, the second fluid contact device 175 has the same number of fluid contacts 210, 215, 220, 225 as the first fluid contact device. Thereby, the first fluid contact device and the second fluid contact device 175 are arranged complementarily to each other. In the embodiment, the fifth to eighth fluid contacts 210, 215, 220, 225 are embodied identically to one another by way of example. In this context, the fifth fluid contact 210 is tubular in shape. The fifth fluid contact 210 extends in parallel to the further axis of rotation $Ra_{n+-1}$. Thereby, with a fixed end, the fifth fluid contact 210 is connected to a third front face 230 of the second connecting plate 170. On the circumferential side, the fifth fluid contact 210 may be sealed.

Figure 5:
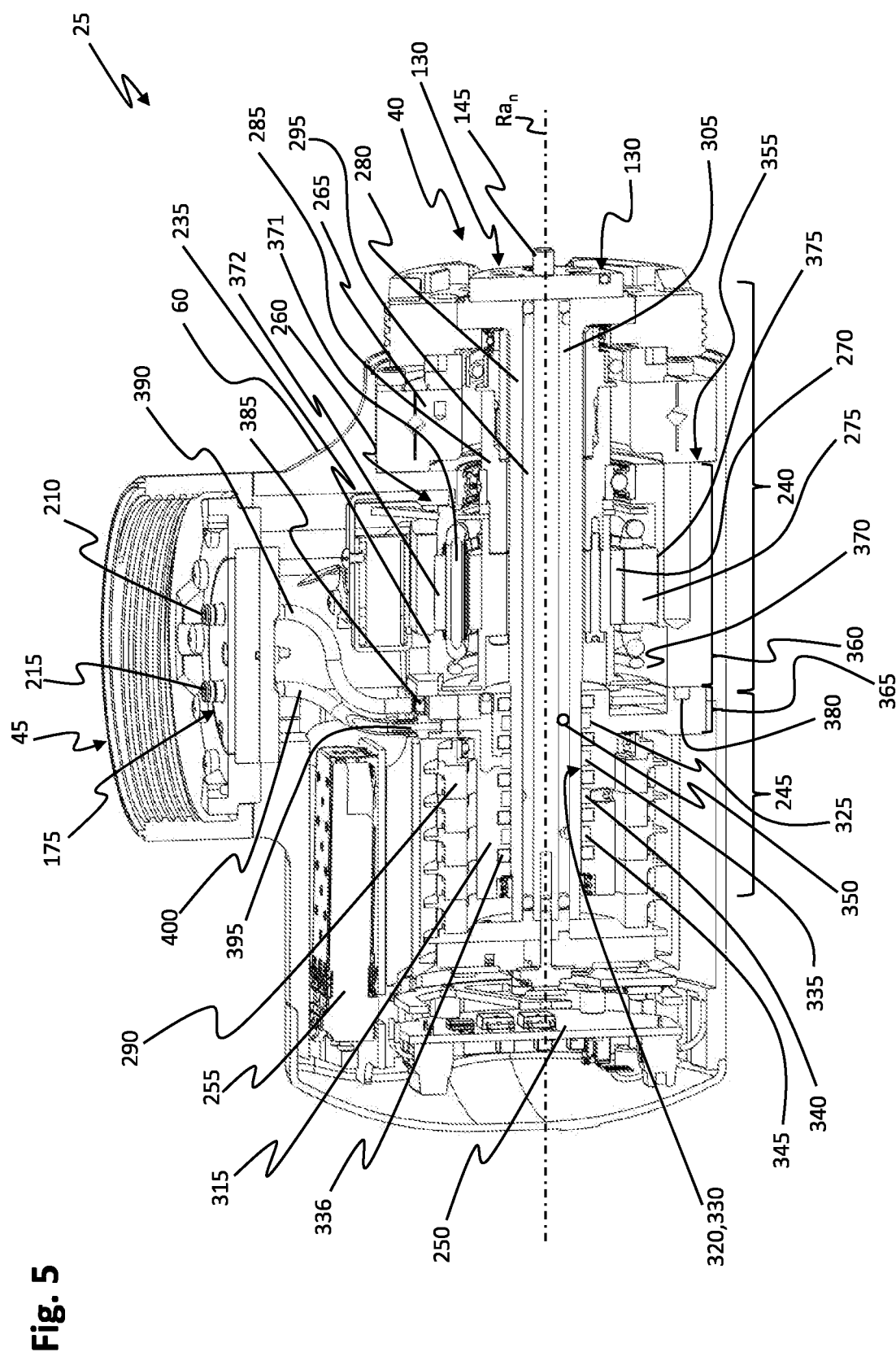
FIG. 5 is a perspective longitudinal section through the active arm module shown in FIG. 2.

FIG. 5 shows a perspective longitudinal section through the active arm module 25 shown in FIG. 2. For a better representation of the individual components, the sectional areas are not hatched.

In an interior 235 of the first housing 60, the active arm module 25 comprises a drive device 240, a rotation transmitter 245, a controller 250, and at least one converter 255.

The drive device 240 comprises an electric machine 260 and a gear device 265. The electric machine 260 has a rotor 270 and a stator 275, the rotor 270 being rotatably mounted about the axis of rotation $Ra_n$. The stator 275 is non-rotatably connected to the first housing 60.

In the embodiment, the electric machine 260 is exemplarily embodied as a brushless DC motor. On the input side, the gear device 265 is connected to the rotor 270 in a torque-proof manner. On the output side, the gear device 265 is connected to the first connecting side 40 in a torque-proof manner. In operation of the electric machine 260, the electric machine 260 drives the gear device 265 at a motor speed. The gear device 265 reduces, preferably with a reduction ratio of 1:30 to 1:200, the motor speed to an output speed. The gear device 265 drives the first connecting side 40 and here in particular the first connecting plate 95. The gear device 265 is arranged axially between the electric machine 260 and the first connecting side 40 with respect to the axis of rotation $Ra_n$.

Axially on a side of the drive device 240 facing away from the first connecting side 40, the rotation transmitter 245 is arranged. In the axial direction with respect to the axis of rotation $Ra_n$, the controller 250 is arranged at the opposite end of the first housing 60 with regard to the first connecting side 40. In FIG. 5 on the upper side of the rotation transmitter 245, i.e. on a side facing the second connecting side 45, the converter 255 is arranged.

The first connecting side 40 further comprises a first hollow shaft 280. The drive device 240 comprises a second hollow shaft 285. The second hollow shaft 285 connects the gear device 265 to the rotor 270. Thus, the second hollow shaft 285 rotates at the motor speed and the first hollow shaft 280 rotates at the output speed. The second hollow shaft 285 is shorter in the axial direction than the first hollow shaft 280. The first hollow shaft 280 engages through the second hollow shaft 285 as well as the drive device 240 and the rotation transmitter 245. An optical fiber is arranged centrally in the first hollow shaft 280 for data-connecting the controller 250 to the first contact device 145 in the first hollow shaft 280, which is data-connected to the converter 255. The converter 255 may in turn be data-connected to the controller 250. Furthermore, the converter 255 may be data-connected to the second contact device 180 of the second connecting side 45 by a second optical waveguide. The converter 255 is configured to convert the optical signal transmitted by the first optical fiber into an electrical data signal and to provide it to the controller 250. Also, by the converter 255, a further electrical data signal provided by the controller 250 may be converted into an optical data signal by the converter 255 and transmitted to the first and/or second contact device 145, 180. The controller 250 and the converter 255 may also be of integrated embodiment. Another embodiment of the data transmission between the first contact device 145 and the second contact device 180 may also be provided.

The rotation transmitter 245 comprises at least one slip ring unit 290. Preferably, the rotation transmitter 245 has a plurality of slip ring units 290 arranged axially adjacent to each other. In each case, a power contact of the first power contact device is electrically connected to an associated slip ring unit 290 by an electrical connection arranged in the first hollow shaft 280. On the output side, the slip ring unit 290 is electrically connected to the second power contact device of the second connecting side 45. The slip ring unit 290 ensures transmission of the electrical power exchanged between the first power contact device and the second power contact device even when the first connecting side 40 rotates about the axis of rotation $Ra_n$.

The controller 250 is electrically connected to the first power contact device and/or the second power contact device via the slip ring unit 290 via a third electrical connection.

For each of the first to fourth fluid contacts, first to fourth shaft fluid channels 295, 305 are arranged in the first hollow shaft 280 and are circumferentially offset by 90°, by way of example. Each of the first to fourth shaft fluid channels 295, 305 is fluidically connected to the associated fluid contact. In this regard, the first to fourth shaft fluid channels 295, 305 each extend substantially along the axis of rotation $Ra_n$ with a radial offset from the axis of rotation $Ra_n$. The respective first to fourth shaft fluid channel 295, 305 opens at the respective associated first to fourth fluid contact.

The rotation transmitter 245 comprises a third housing 315. The third housing 315 comprises a bore-shaped receptacle 320, wherein the first hollow shaft 280 extends through the receptacle 320. The third housing 315 comprises at least a first pickup channel 325 configured in a groove-like manner, wherein the first pickup channel 325 is annularly disposed internally on a first inner circumferential side 330 of the receptacle 320. In addition, the third housing 315 may also have second to fourth pickup channels 335, 340, 345 that are axially offset from one another with respect to the axis of rotation $Ra_n$. The pickup channels 325, 335, 340, 345 are each fluidically sealed with respect to each other and with respect to the interior 235 by an axial seal 336. This prevents fluid 51 from entering the interior space 235. The slip ring unit 290 and at least one of the pickup channels 325, 335, 340, 345 may be arranged in a radially overlapping manner. In the embodiment, the slip ring unit 290 partially surrounds the third housing 315.

In order to fluidically connect of the third shaft fluid channel 305 to the first pickup channel 325, a first bore 350 is arranged axially in the first hollow shaft 280 at the level of the first pickup channel 325, said bore being embodied as a through opening in the first hollow shaft 280 and extends from radially outward to radially inward to the third shaft fluid channel 305.

Similarly, the second through fourth pickup channels 335, 340, 345 each having a second through fourth bore disposed in the first hollow shaft 280 may be fluid-connected to the respective associated first to fourth shaft fluid channels 295. The second through to bores are covered in FIG. 5.

The active arm module 25 comprises a heat exchanger 355.

In the axial direction with respect to the axis of rotation $Ra_n$, the heat exchanger 355 is geometrically arranged between the gear device 265 and the rotation transmitter 245. The heat exchanger 355 comprises a heat exchanger fluid channel 380, wherein the heat exchanger fluid channel 380 is fluidically arranged between the rotation transmitter 245 and the second fluid contact device 175. In the embodiment, only a single heat exchanger fluid channel 380 is provided. Also, the heat exchanger 355 may comprise multiple heat exchanger fluid channels 380. The heat exchanger fluid channel 380 opens into the first pickup channel 325 at one end.

Exemplarily, the heat exchanger 355 comprises a first heat exchanger section 360 and a second heat exchanger section 365. The first heat exchanger section 360 is annular or hollow-cylindrical in shape, and may be embodied integrally and materially uniformly with the first housing 60. Alternatively, the first housing 60 and the first heat exchanger section 360 may be formed in two parts, in which case the first heat exchanger section 360 e.g. abuts the inside of the first housing 60 and is fastened to the first housing 60.

Exemplarily, the first heat exchanger section 360 has a substantially annular or hollow-cylindrical base structure, and at a second inner circumferential side 370 of the first heat exchanger section 360, the first heat exchanger section 360 may be stepped. The stepping of the second inner circumferential side 370 serves to provide radial installation space for windings 371 of the stator 275. The heat exchanger 355 is located at the second inner circumferential side 370 at the stator 275 and is thermally coupled to the stator 275.

On the inner side, the stator 275 is in planar contact with a first outer circumferential side 375 of the stator core 372 at the second inner circumferential side 370, so that the stator 275 is thermally coupled to the first heat exchanger section 360. In this regard, the stator core 372 may be press-fitted into the first heat exchanger section 360 for improved planar engagement. Also, in addition to the improved thermal coupling between the first outer circumferential side 375 and the first heat exchanger section 360, a thermal conductive agent, e.g. a thermal conductive paste, in particular e.g. a silver paste, may be provided.

In FIG. 5, the second heat exchanger section 365 is exemplarily embodied integrally and materially integral with the third housing 315 of the rotation transmitter 245. Alternatively, it would also be possible for the second heat exchanger section 365 and the third housing 315 to be embodied in multiple pieces.

Both the first heat exchanger section 360 and the second heat exchanger section 365 have a thermally conductive material, in particular a metal, particularly advantageously an aluminum alloy.

The rotation transmitter 245 includes at least a first connection 385, wherein the first connection 385 is fluidically connected to the fifth fluid contact 210 by a first fluid line 390. Additionally, the rotation transmitter 245 further comprises a second connection 395 to fourth connection. In FIG. 5, only the second connection 395 is shown, as the third and fourth connections are located in front of the sectional plane. In general, it may be said that the number of connections 385, 395 corresponds to the number of pickup channels 325, 335, 340, 345 and to the number of fluid contacts of each of the first or second fluid contact devices 130, 175. Exemplarily, the connection 385, 395 is arranged on the side facing the second connecting side 45. Analogously to the first connection 385, the second connection 395 is fluidically connected to the sixth fluid contact 215 by a second fluid line 400. The first fluid line 390 and/or the second fluid line 400 may e.g. be formed as a tube line or as a metallic pipe line.

Figure 6:
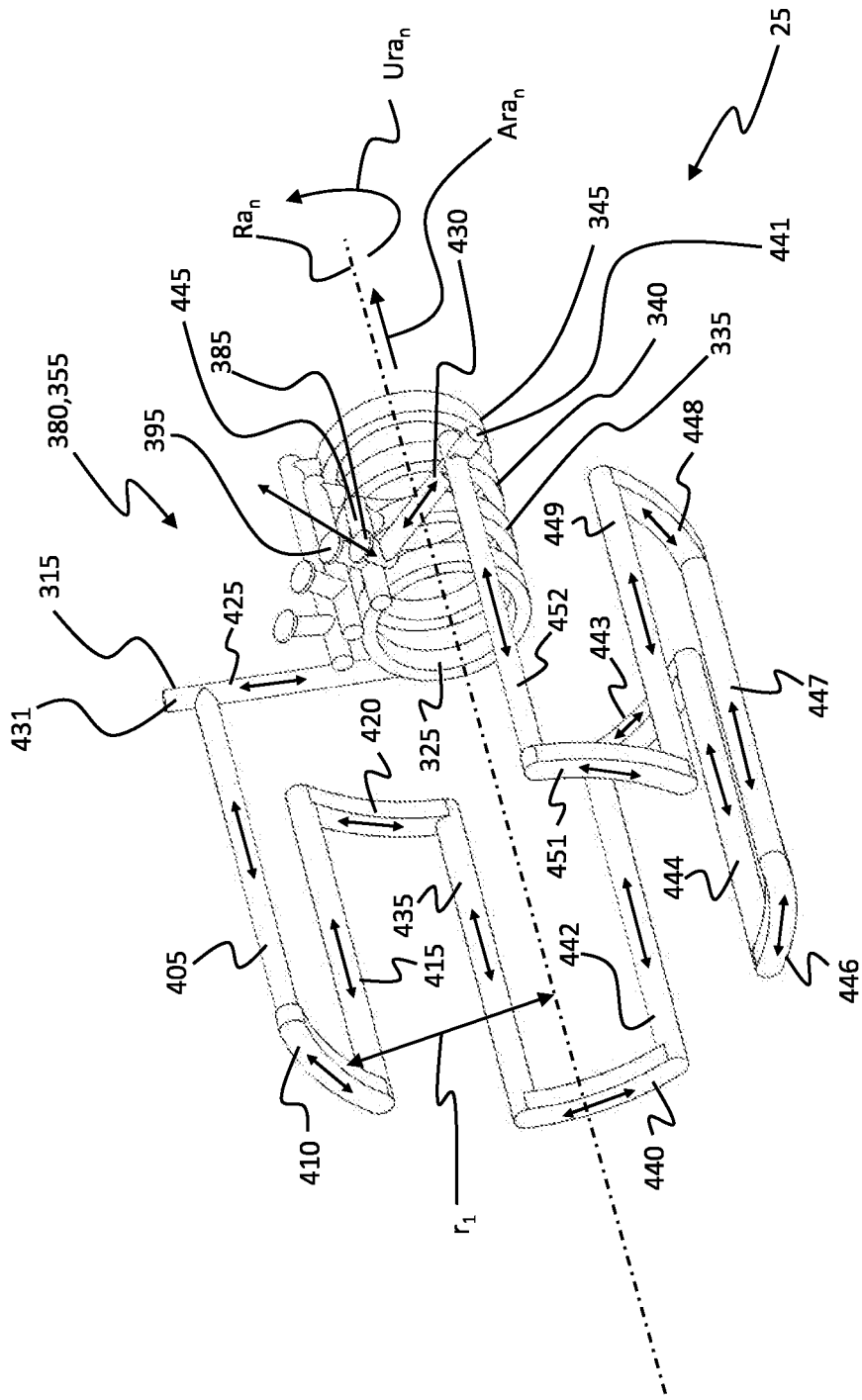
FIG. 6 is a perspective view of a heat exchanger fluid channel of a heat exchanger of the active arm module shown in FIG. 2.

FIG. 6 shows a perspective view of the heat exchanger fluid channel 380 of the heat exchanger 355 in a rotated view relative to FIG. 5.

For clarity reasons, FIG. 6 essentially show only a few components of the active arm module 25 to explain the embodiment of the heat exchanger fluid channel 380.

The heat exchanger fluid channel 380 is meander-shaped in the circumferential direction $Ura_n$ around the stator. This embodiment has the advantage that the heat exchanger fluid channel 380 is particularly simple and the heat exchanger 355 may be manufactured at low cost.

The heat exchanger fluid channel 380 comprises at least a first channel section 405, a second channel section 410, and a third channel section 415. In addition, the heat exchanger fluid channel 380 may also have a fourth to fifteenth channel section 420, 435, 440, 442, 443, 444, 446, 447, 448, 449, 451, 452 and, if necessary, an inlet channel section 425 and a return channel section 430. A different configuration of the heat exchanger fluid channel 380 is conceivable, as well. For example, the number of fourth to fifteenth channel sections 420, 435, 440, 442, 443, 444, 446, 447, 448, 449, 451, 452 may be varied such that the heat exchanger fluid channel has six to ten windings.

In the embodiment, the feed channel section 425 may in sections be embodied as a bore extending radially from the outside to the inside of the third housing 315 of the rotation transmitter 245 and the second heat exchanger section 365. In this context, the feed channel section 425 may be arranged running tangentially to the axis of rotation $Ra_n$ in the third housing 315 and the second heat exchanger section 365, and opening to the inside at the first pickup channel 325. On the outside, the feed channel section 425 is closed by a first closure 431. The first closure 431 may e.g. be a cap screwed into the feed channel section 425. Radially on the outside, the inlet channel section 425 is fluidically connected to the first channel section 405.

In the embodiment, the first, third, fifth, seventh, ninth, eleventh, thirteenth, and fifteenth channel sections 405, 415, 435, 442, 444, 447, 449, 452 are circumferentially offset from one another with respect to the axis of rotation $Ra_n$. In this context, the first, third, fifth, seventh, ninth, eleventh, thirteenth and fifteenth channel sections 405, 415, 435, 442, 444, 447, 449, 452 e.g. have the same radial distance $r_1$ from the axis of rotation $Ra_n$. The first, third, fifth, seventh, ninth, eleventh, thirteenth and fifteenth channel sections 405, 415, 435, 442, 444, 447, 449, 452 are each formed extending along the axis of rotation $Ra_n$, preferably parallel to the axis of rotation $Ra_n$. Thereby, the first, third, fifth, seventh, ninth, eleventh, thirteenth and fifteenth channel sections 405, 415, 435, 442, 444, 447, 449, 452 may be introduced into the first heat exchanger section 360 by a machining process or already, e.g. during casting of the first heat exchanger section 360. The third, fifth, seventh, ninth, eleventh and thirteenth channel sections 405, 415, 435, 442, 444, 447, 449, 452 have a smaller axial extension in the axial direction $Ara_n$ than the first and fifteenth channel sections 405, 452.

On the axial side opposite to the inlet channel section 425, the heat exchanger fluid channel 380 comprises the second channel section 410, wherein the second channel section 410 extends in the circumferential direction. In this context, the second channel section 410 may be embodied in a partial ring shape. The second channel section 410 fluidically connects the first channel section 405 to the third channel section 415.

On the side facing the rotation transmitter 245, the third channel section 415 is connected to the fifth channel section 435 by the fourth channel section 420. The fourth channel section 420 is exemplarily embodied in the shape of a partial ring and extends in the circumferential direction. On the axial side opposite to the fourth channel section 420 (on the side facing the first connecting side), the sixth channel section 440, which in the embodiment is embodied identically to the second channel section 410, connects the fifth channel section 435 to the seventh channel section 442.

On the side facing the rotation transmitter 245, the seventh channel section 442 is connected to the ninth channel section 444 via the eighth channel section 443, which in the embodiment is formed identically to the fourth channel section 420. The eighth channel section 443 is exemplarily embodied in the shape of a partial ring and extends in the circumferential direction.

On the axial side opposite to the eighth channel section 443 (on the side facing the first connecting side), the tenth channel section 446, which in the embodiment is e.g. embodied identically to the second channel section 410, connects the ninth channel section 444 to the eleventh channel section 447.

On the side facing the rotation transmitter 245, the eleventh channel section 447 is connected to the thirteenth channel section 449 by the twelfth channel section 448, which in the embodiment is embodied identically to the fourth channel section 420. The twelfth channel section 448 is exemplarily embodied in the shape of a partial ring and extends in the circumferential direction.

On the axial side facing away from the rotation transmitter 245 (on the side facing the first connecting side), the fourteenth channel section 451, which in the embodiment is identical to the second channel section 410, connects the thirteenth channel section 449 to the fifteenth channel section 452. In this case, the second, sixth, tenth and fourteenth channel sections 410, 440, 446, 451 have the same radial distance $r_1$ to the axis of rotation $Ra_n$ and are arranged in a shared plane perpendicular to the axis of rotation $Ra_n$. Similarly, the fourth, eighth, and twelfth channel sections 420, 443, 448 have the same radial distance r from the rotational axis $Ra_{1n}$ and are arranged in a further shared plane perpendicular to the rotational axis $Ra_n$. The fifteenth channel section 452 opens into the return channel section 430 on the side facing the rotation transmitter 245.

The arrangement of the first to fifteenth channel sections 405, 410, 415, 420, 435, 440, 442, 443, 444, 446, 447, 448, 449, 451, 452 is thereby dimensioned in such a way that the heat exchanger fluid channel 380 is guided at least 270°, preferably 330° around the axis of rotation $Ra_n$ and the stator in a meandering manner. The fifteenth channel section 452 opens into the return channel section 430 at the front face. The return channel section 430 is oriented tangentially to the axis of rotation $Ra_n$ and is e.g. embodied as a blind bore. Radially outwardly, the return channel section 430 is closed by a second closure 441. The second closure 441 may be identical to the first closure 431. Radially inwardly, the return channel section 430 opens into the first connection 385.

This embodiment has the advantage that the heat exchanger fluid channel 380 may have a particularly long channel length between the first pickup channel 325 and the first connection 385, wherein the return channel section 430 opens, in the heat exchanger 355. In an exemplary embodiment, only the heat exchanger fluid channel 380 connects the first pickup channel 325 to the first connection 385, thereby avoiding bypass flow between the first connection 385 and the first pickup channel 325.

The second pickup channel 335 is directly connected to the second connection 395 by a short connecting channel 445 extending in the third housing 315. Similarly, the third and fourth pickup channels 340, 345 are also directly connected to the respective associated connection by a separate further connecting channel to the associated third and fourth connection, respectively.

Figure 7:
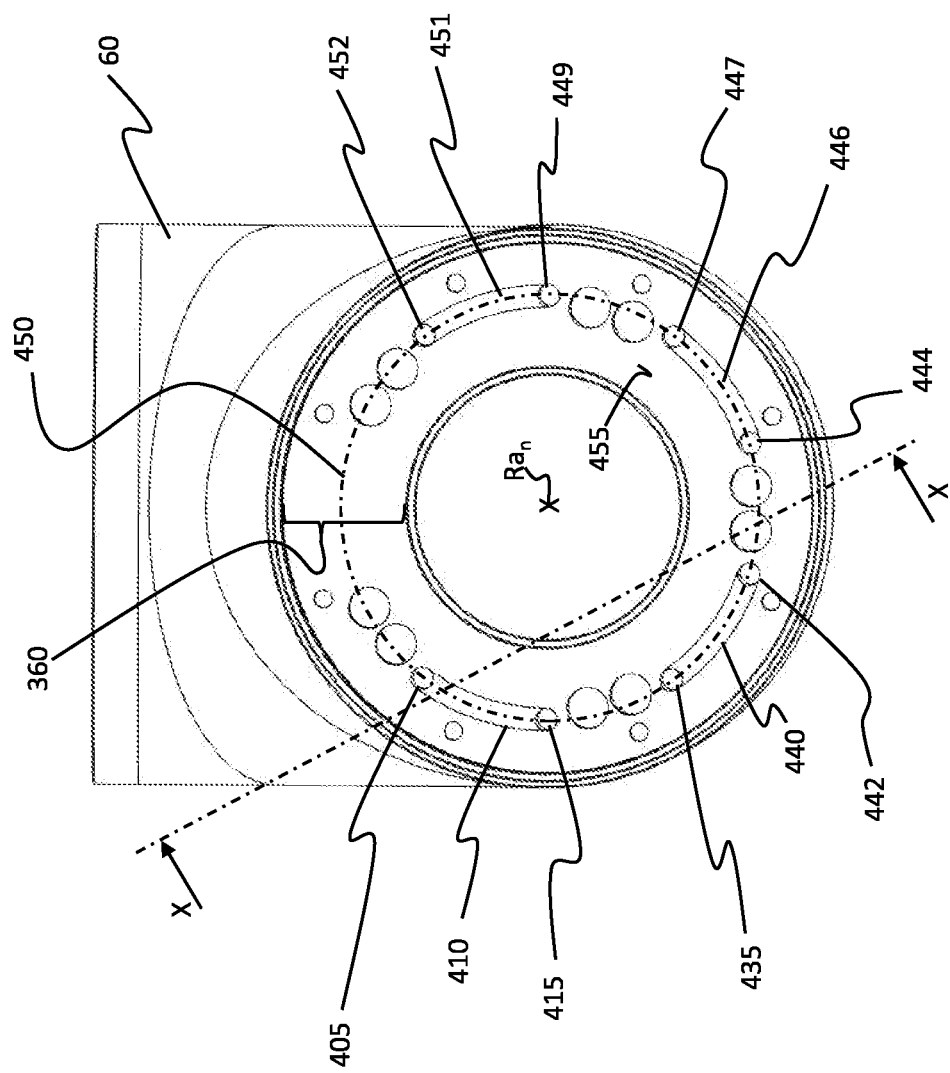
FIG. 7 is a side view of a first housing of the active arm module shown in FIGS. 1 to 3.

FIG. 7 shows a side view of the first housing 60 of the active arm module 25 shown in FIGS. 2 to 3 according to the first embodiment.

The second channel section 410 and the sixth channel section 440 are arranged to extend along a joint first circular path 450 about the axis of rotation $Ra_n$. The first channel section 405, the third channel section 415 and the fifth channel section 435 are arranged at regular intervals in the circumferential direction about the axis of rotation $Ra_n$, so that the third channel section 410 and the sixth channel section 440 extend over an equal angular segment of the first circular path 450. Thereby, the second and/or sixth channel section 410, 440 may be arcuate in shape.

It is of particular advantage, in order to manufacture the first housing 60 in a particularly cost-effective manner, if the second and/or sixth channel section 410, 440 is groove-shaped at a first heat exchanger front face 455 of the first heat exchanger section 360. In this case, the second and/or sixth channel section 410, 440 is open at the first heat exchanger front face 455. The first heat exchanger front face 455 is arranged perpendicular to the axis of rotation $Ra_n$ on a side of the first heat exchanger section 360 facing the first connecting side 40.

Due to the groove-shaped embodiment of the second, sixth, tenth and fourteenth channel sections 410, 440, 444, 451, the second, sixth, tenth and fourteenth channel sections 410, 440, 444, 451 may already be formed during the casting of the first housing 60 or the first heat exchanger section 360. Alternatively, the second and/or sixth and/or tenth and/or fourteenth channel section 410, 440, 444, 451 could be machined into the first heat exchanger face 455, e.g. using a milling process. Also, the second and/or sixth and/or tenth and/or fourteenth channel section 410, 440, 444, 451 could also be cast simultaneously.

A circumferential extension of the second channel section 410 is circumferentially selected such that the first and third channel sections 405, 415 open at respective circumferential ends of the first channel section 410. Similarly, a circumferential extension of the sixth channel section 440 is circumferentially selected such that the fifth and third channel sections 435, 415 open at respective circumferential ends of the sixth channel section 440. The second channel section 410 and the sixth channel section 440 are embodied separately from each other in the circumferential direction.

Figure 8:
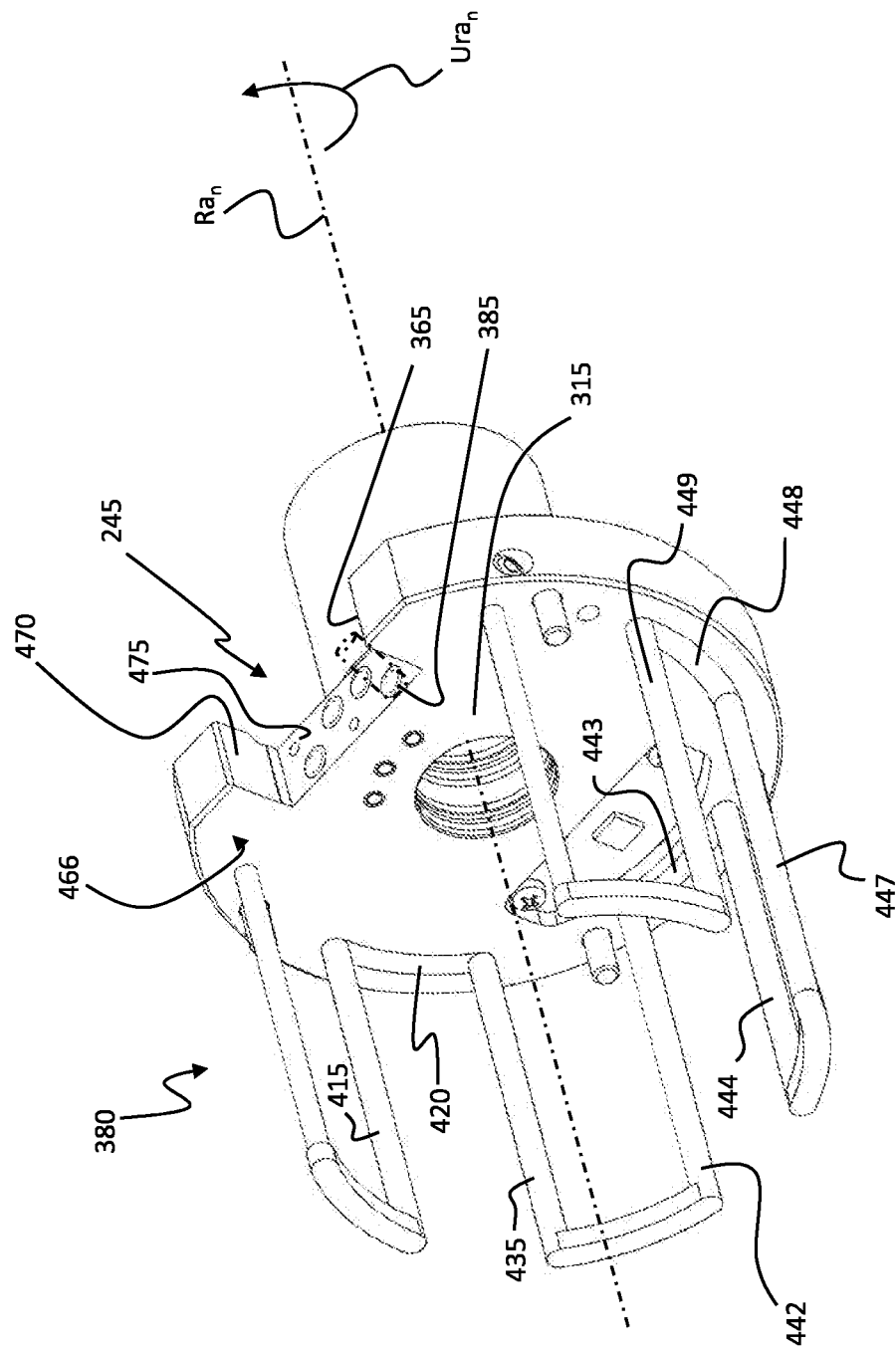
FIG. 8 is a perspective view of a rotation transmitter of the active arm module shown in FIG. 2 and the heat exchanger fluid channel.

FIG. 8 shows a perspective view of the rotation transmitter 245 and of the heat exchanger fluid channel 380 of the active arm module 25 shown in FIG. 2.

The second heat exchanger section 365 may have a (partial) ring shape. In an exemplary embodiment, the second heat exchanger section 365 is integral and materially in one piece with the third housing 315 of the rotation transmitter 245. Exemplarily, the fourth, ninth, and twelfth channel sections 420, 443, 448 are embodied in a groove shape in the second heat exchanger section 365 and are disposed adjacent a second heat exchanger front face 466 of the second heat exchanger section 365. The second heat exchanger front face 466 is arranged perpendicular to the axis of rotation $Ra_n$. The first heat exchanger front face 466 faces the first connecting side. The fourth, ninth and twelfth channel sections 420, 443, 448 are open at the second heat exchanger front face 466. The fourth, ninth and twelfth channel sections 420, 443, 448 may be arranged to extend along a second circular path about the axis of rotation $Ra_n$. The first circular path 450 (cf. FIG. 7) and the second circular path may have the same diameter.

In the circumferential direction, the fourth channel section 420 is selected to be only wide enough so that the third and fifth channel sections 415, 435 each open at one end of a respective fourth channel section 420. Similarly, the ninth and twelfth channel sections 443, 448 are embodied with the fourth, ninth and twelfth channel sections 420, 443, 448 being spatially separated from one another in the circumferential direction.

A first recess 470 may be arranged on the upper side of the third housing 315, wherein the first recess 470 extends from radially outside to radially inside and has a planar recess base 475. In the circumferential direction $Ura_n$, the second heat exchanger section 365 adjoins on both sides of the first recess 470. The first connection 385 to the fourth connection are arranged at the recess base 475. FIG. 8 only shows the first connection 385 in dashed lines for clarity.

Figure 9:
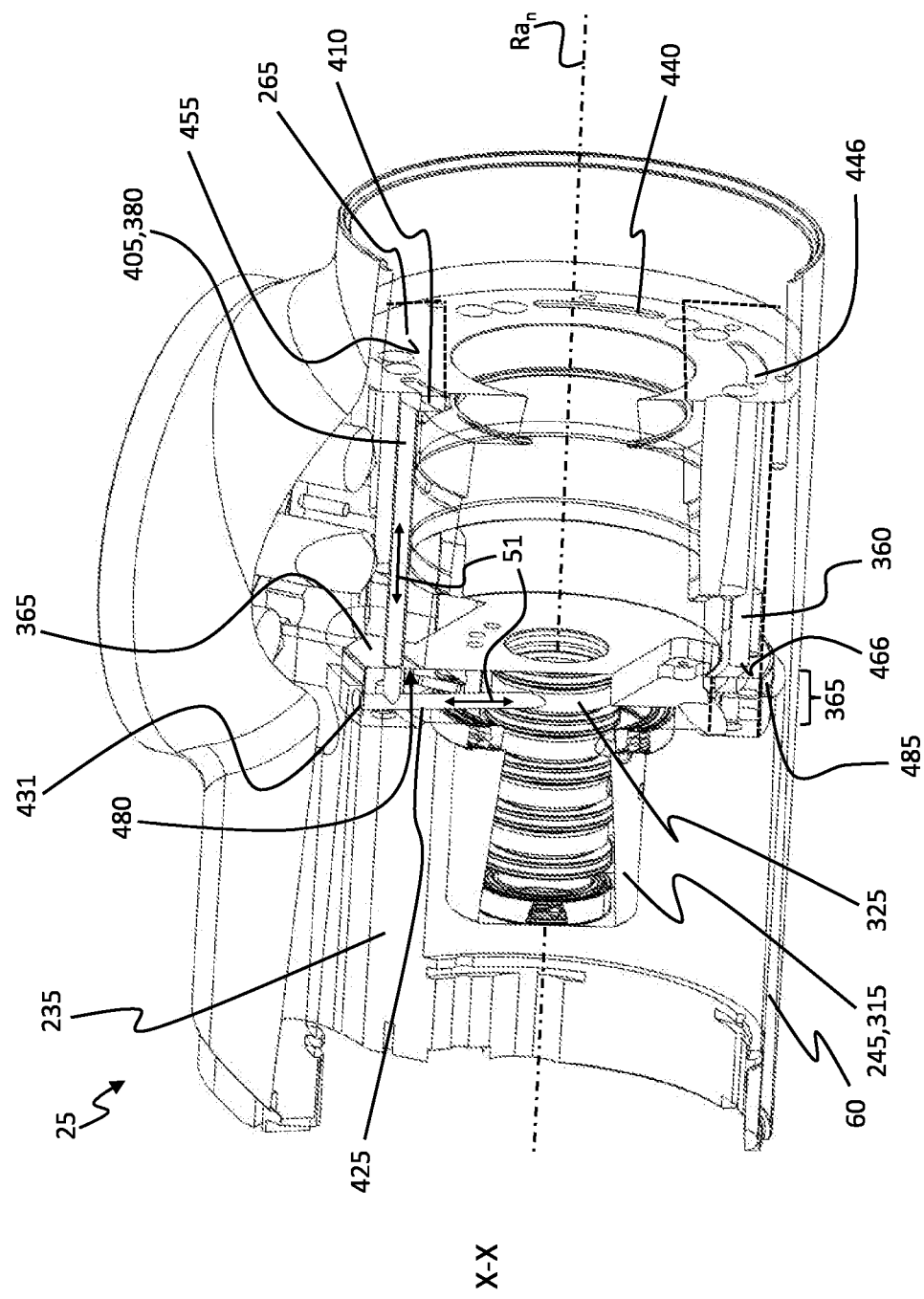
FIG. 9 is a sectional view along a sectional plane X-X shown in FIG. 7 through the active arm module shown in FIG. 7.

FIG. 9 shows a sectional view through the active arm module 25 along a sectional plane X-X shown in FIG. 7, wherein only the first housing 60 and the rotation transmitter 245 are illustrated in FIG. 9 for reasons of clarity. Furthermore, the sectional planes in FIG. 9 are not shown closed.

The second heat exchanger section 365 abuts a third heat exchanger front face 480 of the first heat exchanger section 360 with the second heat exchanger front face 466. The third heat exchanger front face 480 is arranged on the side of the first heat exchanger section 360 facing away from the first connecting side and, like the first and second heat exchanger front faces 455, 466, extends in a plane of rotation perpendicular to the axis of rotation $Ra_n$.

On the circumferential side, a centering shoulder 485 may be provided in the first housing 60 for centering the second heat exchanger section 365 and—insofar as the third housing 315 is embodied integrally and of the same material with the second heat exchanger section 365—also the rotation transmitter 245, on which shoulder the second heat exchanger section 365 is centered on the circumferential side, so that a reliable orientation and alignment of the two heat exchanger sections 360, 365 relative to one another in the radial direction are defined.

Further, a first seal may additionally be provided between the second and third heat exchanger front faces 466, 480 to fluidically seal the heat exchanger fluid channel 380 from the interior 235. The first seal may be embodied from a cured liquid seal and/or may comprise one or a plurality of sealing rings.

On the side axially facing the first connecting side, the second, sixth, tenth and fourteenth channel sections 410, 440, 444, 451 arranged in the first heat exchanger section 360 are closed at the front face by a contact of the gear device 265 (schematically indicated by dashed lines) with the first heat exchanger front face 455.

A second seal may be disposed between the gear device 265 and the first heat exchanger face 455 to fluidically seal the heat exchanger fluid channel 380 at the first heat exchanger front face 455. The first and/or second seal may be a fluid seal.

As has been described above, the delivery device 515 draws in the fluid 51. It causes the fluid 51 to flow radially outward from the first pickup channel 325 via the feed channel section 425 in the active arm module 25 shown in FIG. 9. In doing so, the fluid 51 cools the third housing 315 of the rotation transmitter 245 and the second heat exchanger section 365 while absorbing heat from the third housing 315. Once radially outward, the fluid 51 is prevented from exiting the heat exchanger fluid channel 380 by the first closure 431. After flowing through the inlet channel section 425, the fluid 51 enters the first channel section 405 and is in the axial direction $Ara_n$ directed to the second channel section 410.

Figure 10:
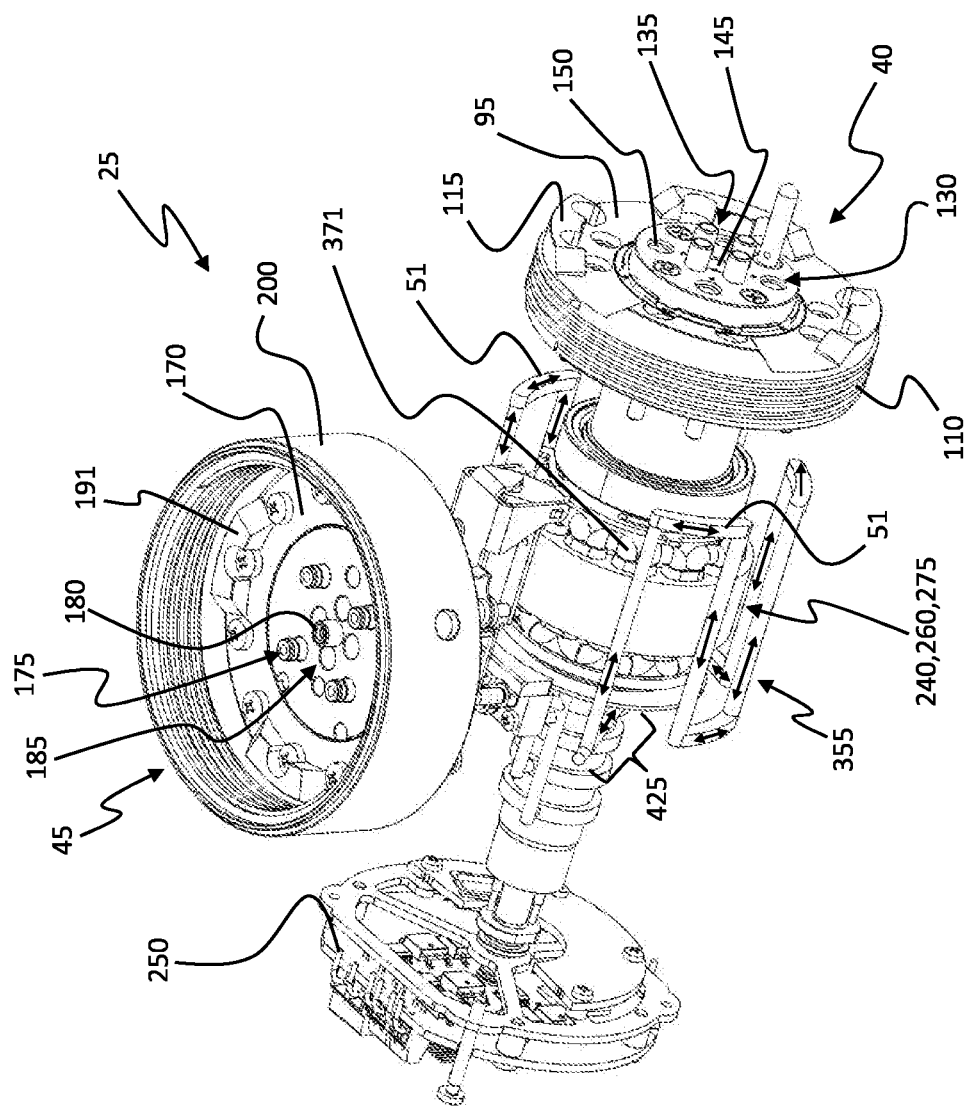
FIG. 10 is a perspective view of the active arm module shown in FIG. 2.

FIG. 10 shows a perspective view of the active arm module 25, although numerous components have been omitted for clarity and to improve explanation of the operation of the active arm module 25. In this context, the following FIG. 10 is explained in conjunction with FIG. 1 and FIG. 6, so that the reference signs shown in FIGS. 1, 6, and 10 are used to explain the operation of the robot arm 20 in more detail.

For example, in the assembled state of the robot arm 20, the second connecting side 45.1 of the first arm module 25.1 and the first connecting side 40.2 of the second active arm module 25.2 engage with each other.

For mechanical fastening in the axial direction, the fastening ring 200 is screwed onto the external thread 110 so that the second connecting plate 170 of the second connecting side 45.1 of the first active arm module 25.1 and the first connecting plate 95 of the first connecting side 40.2 of the second active arm module 25.2 are pressed against each other.

The first face gearing 115 and the second face gearing 191 engage with each other for torque-proof transmission. For data connection, the first contact device 145 of the second active arm module 25.2 contacts the second contact device 180 of the first active arm module 25.1 so that the controller 250 is data-connected to the robot base 15 via the data connection with the first and second contact device 145, 180.

Thus, the data signal may be transmitted from the robot base 15 (cf. FIG. 1) via the third passive arm module 30.3 to the first active arm module 25.1. From the first active arm module 25.1 and then across the second connecting side 45.1 of the first active arm module 25.1 and the first connecting side 40.2 of the second active arm module 25.2, the optical signal may be transmitted to the second active arm module 25.2. The optical signal may then be further transmitted in the active arm module 25, e.g. the second active arm module 25.2 to the second connecting side 45.2 of the second active arm module 25.2. The optical signal is then transmitted via the other active and passive arm modules 25, 30 to the end effector connecting side 35. The end effector connected to the end effector connecting side 35 may be addressed by the transmitted optical signal. Furthermore, the transmitted optical signal may be used to control the passive and active arm modules 25, 30 arranged between the robot base 15 and the end effector connecting side 35.

Similarly, the first power contact device 135 contacts the second power contact device 185, and electrical power transmitted through the power contact devices 135, 185 may thereby be used to operate the electrical machine 260, particularly to energize windings of the stator 275 and to operate the converter and the controller 250. Electrical power is provided by the robot base 15 to supply electrical power to all of the arm modules 18 and the end effector connecting side 35.

Thus, electrical power is transferred from the robot base 15 to the second active arm module 25.2 at least in part through the second connecting side 45.1 of the first active arm module 25.1 and the first connecting side 40.2 of the second active arm module 25.2. The second active arm module 25.2 also provides electrical power to the second connecting side 45.2 of the second active arm module 25.2 through the electrical connection between the first power contact device 135 and the second power contact device 185 and the second active arm module 25.2.

As a result, electrical power may be transmitted across the active arm modules 25 and the passive arm modules 30 from the robot base 15 toward the end effector connecting side 35 via the first and second connecting sides 40, 45.

In each case, to transfer the fluid 51 from the robot base 15 to the end effector connecting side 35, the first fluid contact device 130 engages the second fluid contact device 175 to provide a fluid-tight connection between the first connecting side 40.2 of the second active arm module 25.2 and the second connecting side 45.1 of the first active arm module 25.1. In this regard, e.g. the fifth fluid contact 210 engages the first fluid contact 150. Similarly, the second fluid contact 155 engages the sixth fluid contact 215, the third fluid contact 160 engages the seventh fluid contact 220, and the fourth fluid contact 165 engages the eighth fluid contact 225, forming a fluid-tight connection between the first connecting side 40.2 of the second active arm module 25.2 and the second connecting side 45.1 of the first active arm module 25.1, respectively.

The fluid 51 is transferred and sucked in from the first connecting side 40.1 to the second connecting side 45.1 of the first active arm module 25.1 via the first active arm module 25.1. Thereby, the fluid 51 is provided with a first temperature level, e.g. from 5° C. to 20° C. at the robot base. Fluid 51 flows from the third passive arm module 30.3 via the first fluid contact 150 of the first fluid contact device 130 (cf. FIG. 5) via the first shaft fluid channel 295 in the axial direction in the direction of the rotation transmitter 245. Fluid 51 enters the first pickup channel 325 via the first bore 350. Through the first pick-up channel 325, which is formed circumferentially around the axis of rotation $Ra_n$, the fluid transmission may be transmitted from the first shaft fluid channel 295 to the rotationally fixed rotation transmitter 245 irrespective of the orientation of the first connecting side 40.1 of the first active arm module 25.1.

Suctioning the fluid 51 through the active arm modules 25 has the advantage over pumping the fluid 51 through the active arm modules 25 that, in the event of a leak in the fluid channels within an active arm module 25, no fluid 51 flows into the active arm module 25 with the electrical and electronic components contained therein, so that necessary safety is also provided in the event of a leak.

During operation or activation of the drive device 240, the second active arm module 25.2 rotates relative to the first active arm module 25.1 about the second axis of rotation $Ra_2$ and torque is exchanged between the first active arm module 25.1 and the second active arm module 25.2. Due to the further arm modules 18 connected to the second active arm module 25.2 towards the end effector, the drive device 240 of the second active arm module 25.2 has to apply a very high torque around the further arm modules 18 around the second rotational axis $Ra_2$ when pivoting the further arm modules connected to the second active arm module 25.2. The high torque requires a high current consumption of the windings 371 of the drive device 240 of the second active arm module 25.2. Due to the electrical resistance of the windings 371 of the stator 275 of the second active arm module 25.2, the stator 275 heats up strongly, especially at high electrical currents. This may lead to thermal damage of the stator 275, in particular the windings 371 of the stator 275.

In the further embodiment of the industrial robot 10, during operation of the industrial robot 10 the robot base 15 is supplied with pressurized fluid 51, preferably compressed air or cooling fluid. The fluid 51 may be used at the end effector connecting side for cooling a chip-removing process. The fluid 51 is pumped into the fluid lines of the robot base 15 via the feed pump 515. The fluid 51 is introduced via the robot base 15 first into the third passive arm module 30.3 and then via the first active arm module 25.1.

In the further embodiment, as well, the fluid 51 is transferred and passed on from the first connecting side 40.1 to the second connecting side 45.1 of the first active arm module 25.1 via the first active arm module 25.1. Thereby, the fluid 51 is provided to the robot base 15 with the first temperature level. From the third passive arm module 30.3, the fluid 51 flows via the first fluid contact 150 of the first fluid contact device 130 (cf. FIG. 5) via the first shaft fluid channel 295 in the axial direction in the direction of the rotation transmitter 245. The fluid 51 enters the first pickup channel 325 via the first bore 350. Through the first pick-up channel 325, which is formed circumferentially around the axis of rotation $Ra_n$, the fluid transmission may be transmitted from the first shaft fluid channel 295 to the rotation transmitter 245, which is arranged in a torque-proof manner, irrespective of the orientation of the first connecting side 40.1 of the first active arm module 25.1.

The pressurized fluid 51 has the advantage that a high mass flow of fluid 51 through the robot arm 20 may be ensured. This may ensure good cooling of all active arm modules 25 of the robot arm 20.

Figure 11:
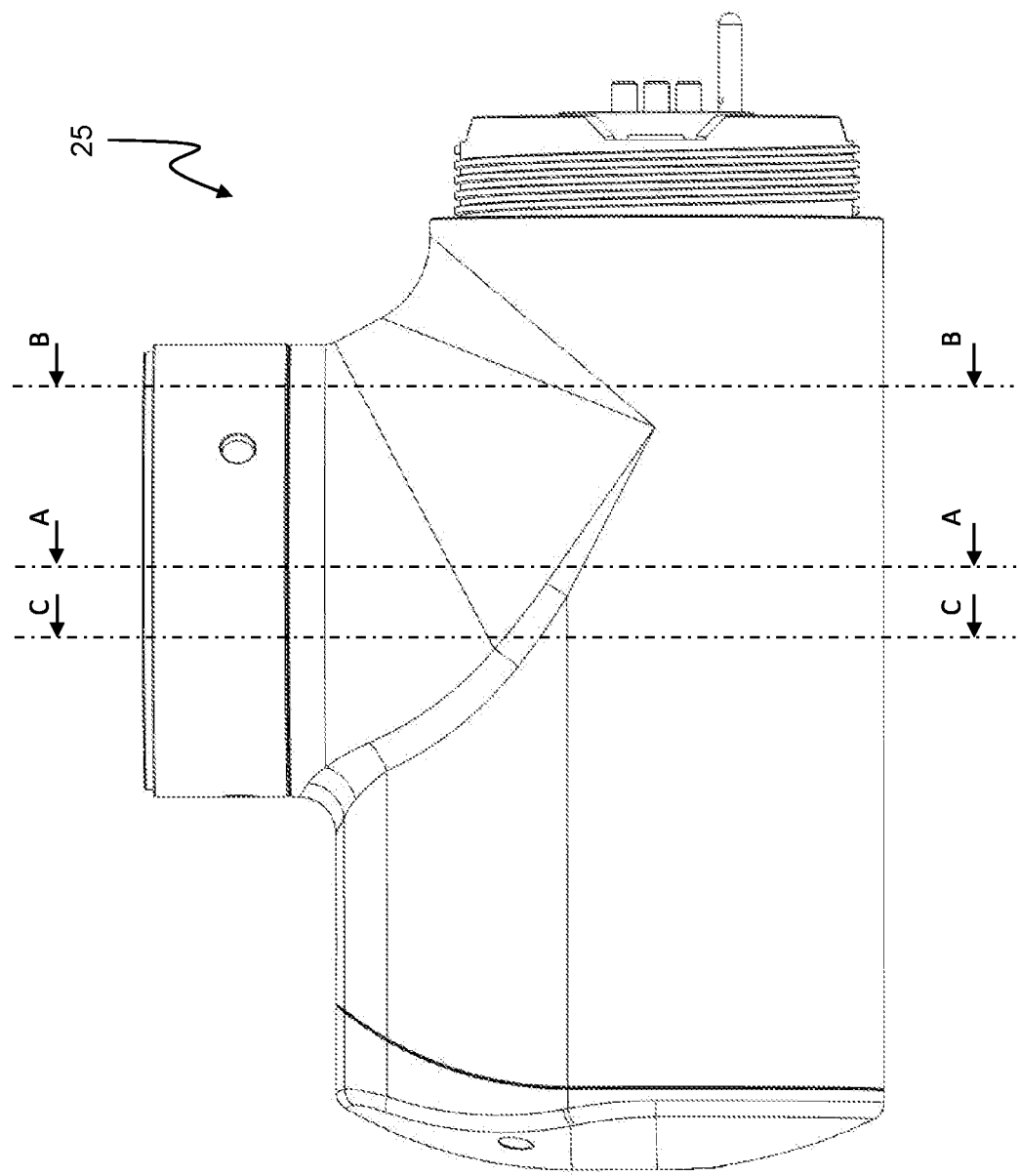
FIG. 11 is a side view of the active arm module shown in FIG. 2.
Figure 12:
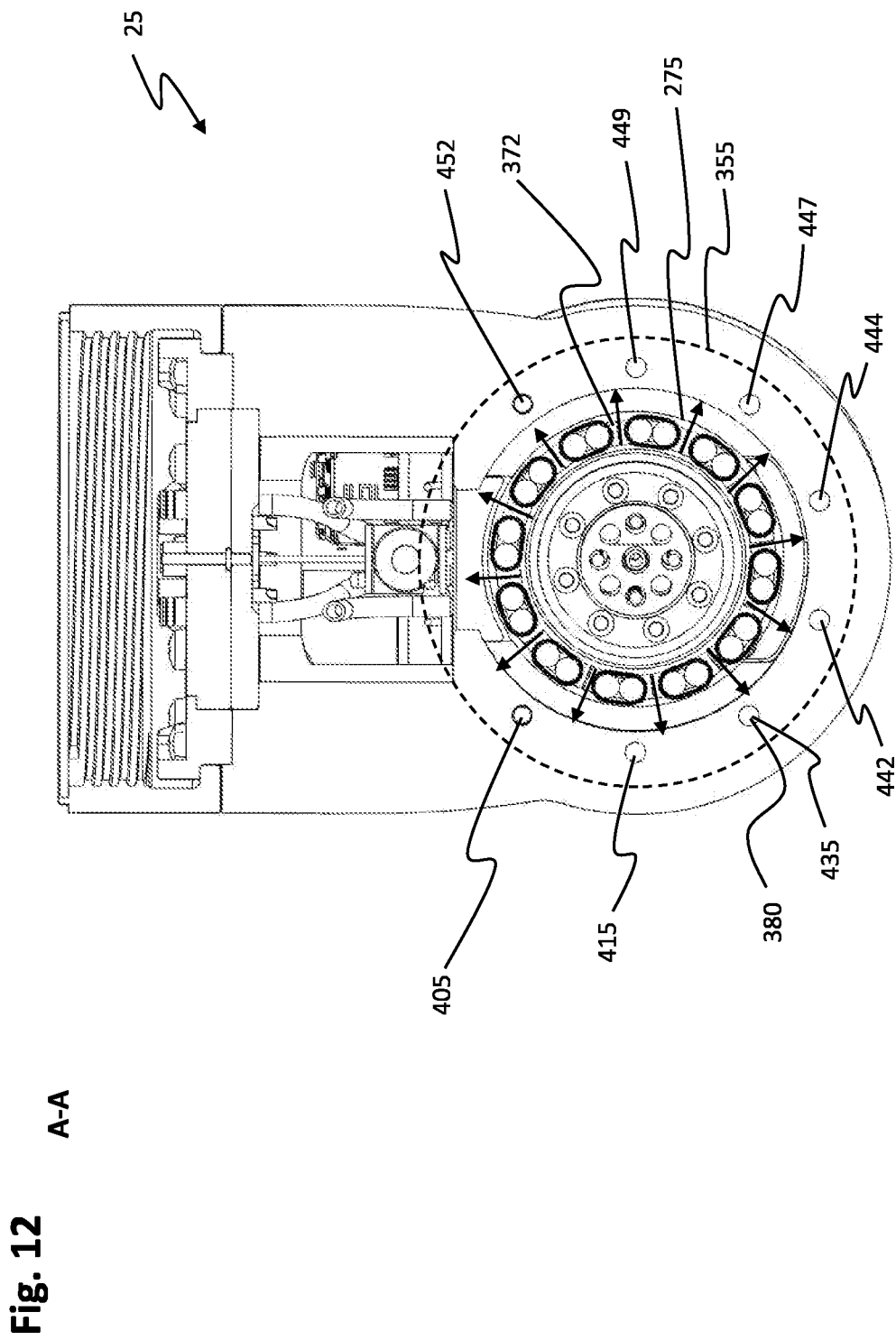
FIG. 12 is a sectional view along a sectional plane A-A shown in FIG. 11.

FIG. 11 shows a side view of the active arm module 25. FIG. 12 shows a sectional view along a sectional plane A-A shown in FIG. 11.

Due to the thermal coupling of the heat exchanger 355 with the stator 275, in particular with the stator core 372, the heat exchanger 355 is also heated when the stator 275 is heated. A heat flow is symbolically shown in FIG. 12 by arrows. The heat exchanger 355 has heat-conductive material and transfers the heat towards the heat exchanger fluid channel 380.

Figure 13:
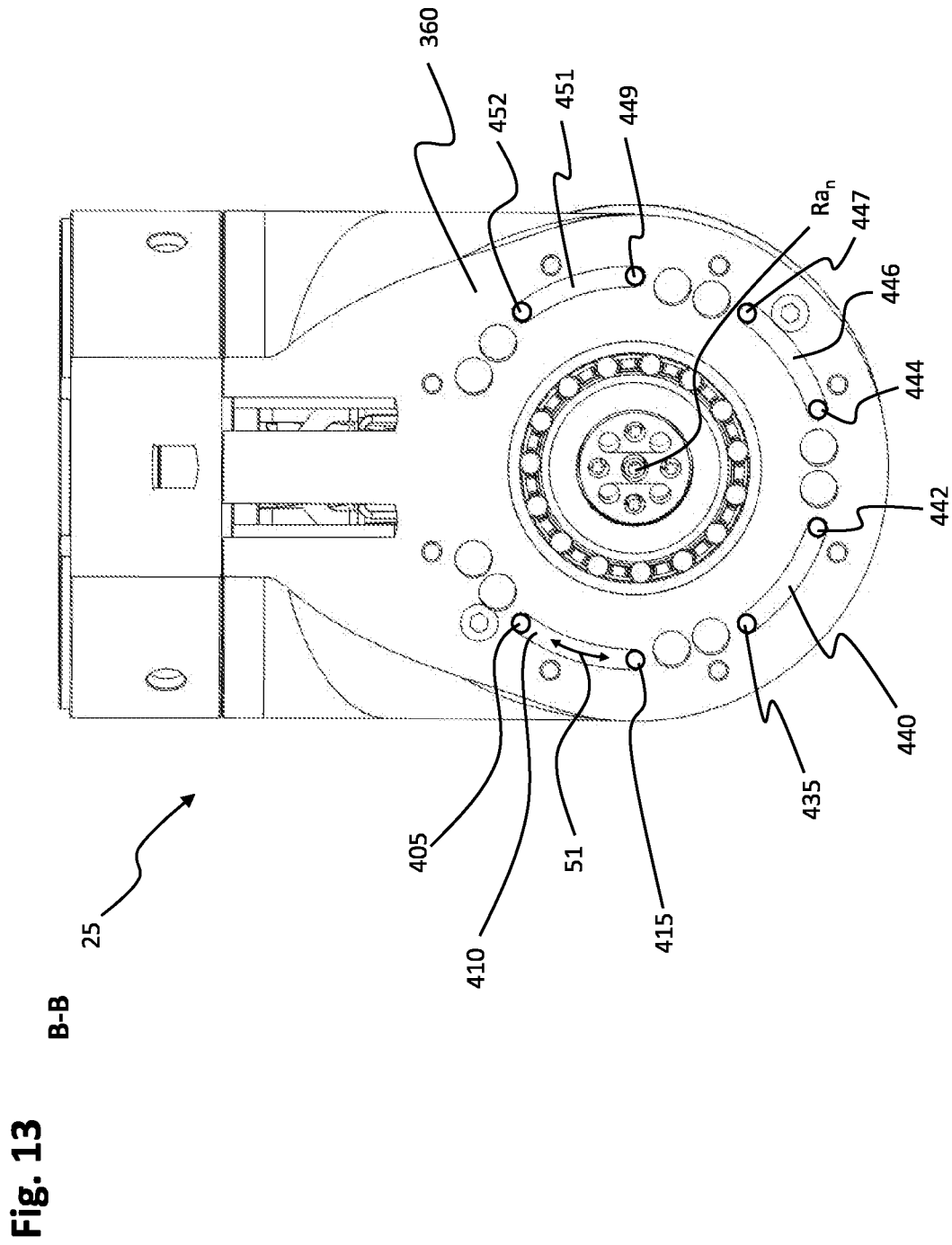
FIG. 13 is a sectional view along a sectional plane B-B shown in FIG. 11.

FIG. 13 shows a sectional view along a sectional plane B-B shown in FIG. 11 through the active arm module 25 shown in FIG. 11.

The fluid 51 flows from the second heat exchanger section through the first channel section 405 into the second channel section 415. In the second channel section 410, the fluid 51 is guided around the axis of rotation $Ra_n$ in the circumferential direction on the side facing the first connecting side. After flowing through the second channel section 410, the fluid 51 flows through the third channel section 415 again in the axial direction $Axa_n$ in the direction of the second heat exchanger section. As already described in connection with FIG. 6, the fluid 51 then flows through the fourth to fifteenth channel sections 420, 435, 440, 442, 443, 444, 446, 447, 448, 449, 451, 452 in the further course. As the fluid 51 flows through the first through fifteenth channel sections 405, 410, 415, 420, 435, 440, 442, 443, 444, 446, 447, 448, 449, 451, 452, it absorbs heat from and cools the first heat exchanger section 360.

Figure 14:
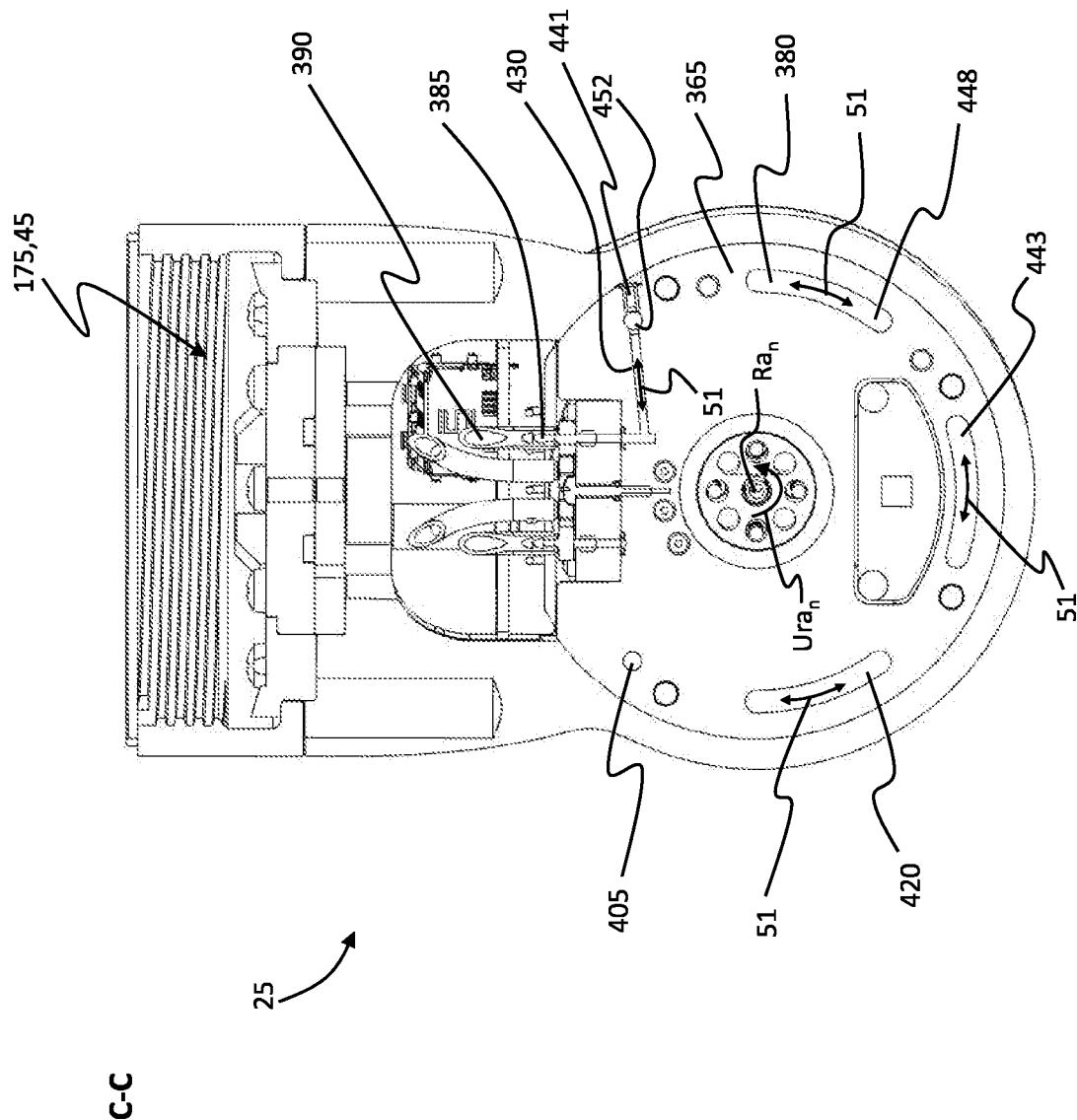
FIG. 14 is a sectional view along a sectional plane C-C shown in FIG. 11.

FIG. 14 shows a sectional view along a sectional plane C-C shown in FIG. 11 through the active arm module 25 shown in FIG. 11.

Thereafter, the fluid 51 flows into the fourth channel section 420. The fourth channel section 420 guides the fluid 51 along the second heat exchanger front face in the circumferential direction $Ura_n$. The second heat exchanger section 365 is thermally coupled to the first heat exchanger section 360, so that in the fourth channel section 420 the fluid 51 cools or absorbs heat from both the first heat exchanger section 360 and the second heat exchanger section 365. Thereby, in the fourth channel section 420, the fluid 51 is further guided around the rotational axis $Ra_n$ in the circumferential direction $Ura_n$. The features described here for the fourth channel section 420 apply in an analogous manner to the eighth and twelfth channel sections 443, 448 of the heat exchanger fluid channel 380.

Figure 15:
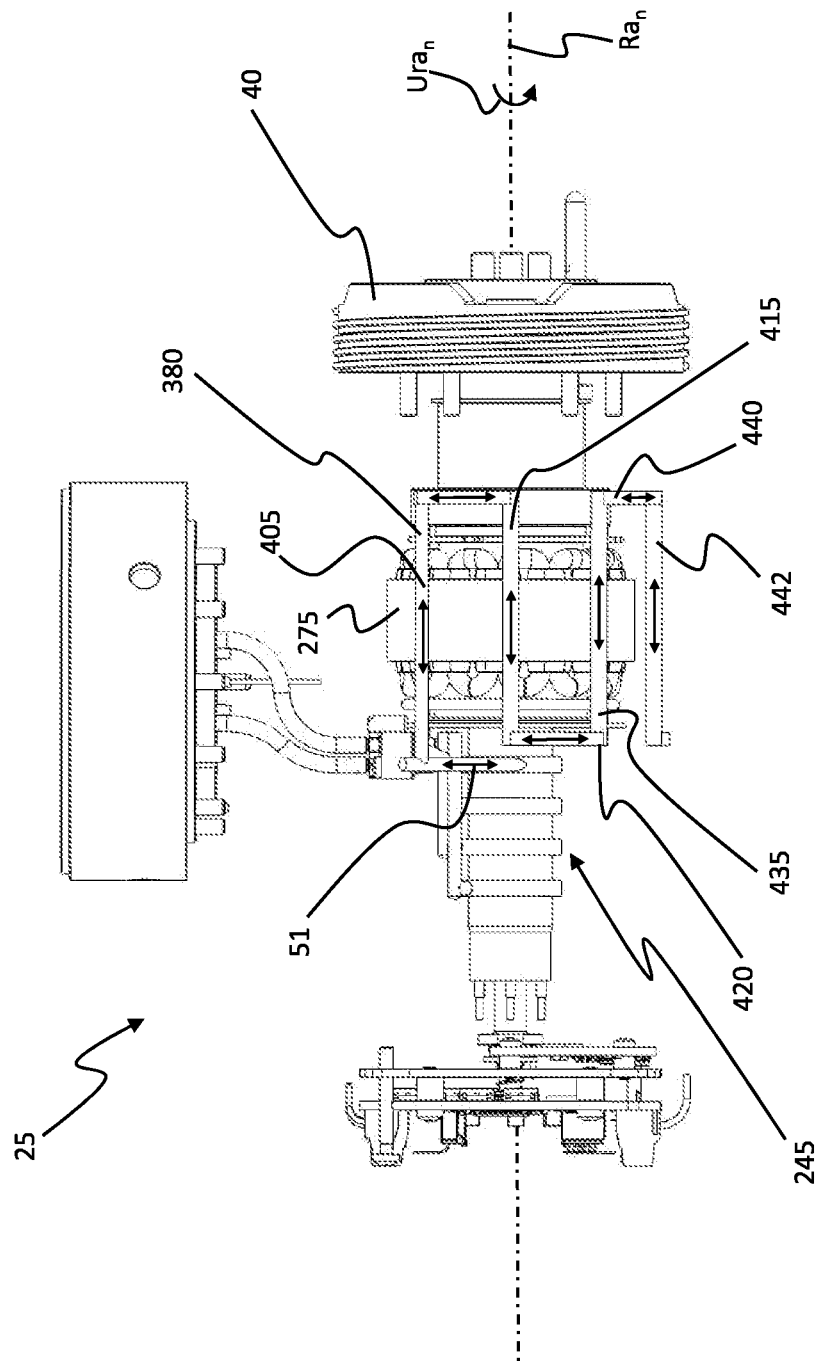
FIG. 15 is a side view of the embodiment of the active arm module according to the first embodiment shown in FIG. 11.

FIG. 15 shows a side view of the embodiment of the active arm module 25 shown in FIG. 11.

After flowing through the fourth channel section 420, the fluid 51 enters the fifth channel section 435 and is guided in an axially offset direction relative to the first channel section 405 back in the direction of the first connecting side 40 to the sixth channel section 440. In the sixth channel section 440, the fluid 51 flows in the circumferential direction $Ura_n$ in the same direction as in the second channel section 410. After flowing through the sixth channel section 440, the fluid 51 is guided into the seventh channel section 442. The seventh channel section 442 guides the fluid in the axial direction $Axa_n$ in the direction of the rotation transmitter 245.

In the following, FIGS. 13 to 15 are described in conjunction.

After flowing through the seventh channel section 442, the eighth channel section 443 (cf. FIG. 14) guides the fluid 51 in the circumferential direction $Ura_n$ to the ninth channel section 444 (cf. FIG. 13). In the ninth channel section 444, the fluid 51 is guided in the axial direction $Axa_n$ of the first connecting side 40 to the tenth channel section 446. The tenth channel section 446 diverts the fluid 51 again in the circumferential direction $Ura_n$ and guides the fluid 51 in the circumferential direction $Ura_n$ to the eleventh channel section 447. The eleventh channel section 447 guides the fluid 51 in the axial direction $Axa_n$ towards the rotation transmitter 245. At the end of the eleventh channel section 447, the fluid 51 flows into the twelfth channel section 448. The twelfth channel section 448 guides the fluid 51 in the circumferential direction $Ura_n$ to the thirteenth channel section 449. In the thirteenth channel section 449, the fluid 51 flows in the axial direction $Axa_n$ to the fourteenth channel section 451. The fourteenth channel section 451 guides the fluid 51 in the circumferential direction $Ura_n$ to the fifteenth channel section 452. The fifteenth channel section 452 for in the axial direction $Axa_n$ the fluid 51 to the return channel section 430.

At the end of the heat exchanger fluid channel 380, the fluid 51 flows through the return channel section 430 toward the first connection 385. At the first connection 385, the fluid 51 is discharged from the heat exchanger 355 or the rotation transmitter 245.

When flowing through the individual first to fifteenth channel sections 405, 410, 415, 420, 435, 440, 442, 443, 444, 446, 447, 448, 449, 451, 452, the fluid 51 heats up with increasing distance covered in the heat exchanger fluid channel 380. Due to the meandering embodiment of the heat exchanger fluid channel 380 and due to the fact that the fluid 51 almost completely surrounds the stator 275 in the circumferential direction by the heat exchanger 355, a particularly good cooling of the stator 275 is achieved. Local temperature differences are compensated for by the heat-conductive material of the heat exchanger 355. The fluid 51 has a second temperature level at the first connection 385, which is higher than the first temperature level.

From the first connection 385, the fluid 51 is directed to the fifth fluid contact via the first fluid line 390, wherein the fifth fluid contact of the second fluid contact device 175 is arranged such that when the second connecting side 45 is mounted to the first connecting side, the fifth fluid contact contacts the first fluid contact.

In the following, reference is made to FIGS. 1, 6 and 10.

The heated fluid 51 is introduced via the second fluid contact device 175 into the first fluid contact device 130 into the second active arm module 25.2 connected to the second connecting side 45.1 of the first arm module 25.1.

Due to the identical embodiment of the first to sixth active arm modules 25.1 to 25.6 across the assemblies, the fluid 51 actively cools the drive device 240, in particular the stator 275 arranged in the respective active arm module 25 on the path between the robot base 15 and the end effector connecting side 35, irrespective of whether the respective first to sixth active arm module 25.1 to 25.6 is currently activated, i.e. the drive device 240 rotates the respective second connecting side 45 or is deactivated. This may result in the other, non-activated arm modules 18, in particular the active arm modules 25, absorbing heat from the heated fluid 51 and cooling the fluid 51. As a result, the arm modules 18 act as a thermal buffer store.

In particular, even in a cold working environment of the industrial robot 10, the fluid 51 may be used in conjunction with the heat exchanger 355 to bring the industrial robot 10 to a working temperature by a preheated fluid 51, in particular after the industrial robot 10 has been stationary for a longer period of time. In this context, the heat-conductive embodiment of the heat exchanger 355 and, in particular, in the case of a one-piece and material-uniform embodiment of the first housing 60 with the heat exchanger 355, the interior of the first housing 60 and the components arranged therein, in particular electronic components such as, for example, the converter or the controller 250, may be preheated. This may e.g. prevent condensation from forming inside the first housing 60, in particular in cold working environments of the industrial robot 10.

The fluid 51, particularly if the fluid 51 is a hydraulic fluid, is again directed over the arm modules 18 toward the robot base 15.

The backflowing fluid 51 is introduced into the second connecting side 45 via the sixth fluid contact. The sixth fluid contact is arranged correspondingly to the second fluid contact and contacts the second fluid contact in the assembled state of the robot arm. When flowing back, the fluid 51 flows from the second connecting side 45 via the second fluid line to the second connection 395. The second connection 395 is connected in a short path (without a heat exchanger channel) to the second pickup channel 335, so that, bypassing the heat exchanger fluid channel 380, the back-flowing fluid 51 is guided into the second pickup channel 335. From the second pickup channel 335, the back-flowing fluid 51 is guided via the second shaft fluid channel towards the second fluid contact of the first fluid contact device 130 of the first connecting side 40. This prevents cooled active arm modules 25 from being heated by the back-flowing heated fluid 51 instead of cooled.

In the further development of the industrial robot 10 explained in FIG. 1 (i.e., when the fluid 51 is fed into the robot base 30 under pressure), depending on the embodiment of the end effector, the fluid 51 may e.g. be used for cooling and lubricating a milling process, and may e.g. be ejected at the end effector. For example, if the fluid 51 is compressed air, the fluid 51 may be discharged into the environment at the end effector. Also, the fluid 51 may be used in the end effector to e.g. actuate a compressed air actuator and may be discharged into the environment after actuation.

In the further embodiment of the industrial robot 10 shown in FIG. 1, it is also conceivable that the flow direction of the fluid 51 is the reverse of the embodiment described above. Exemplarily, the fluid 51 may be guided via the second fluid contact, the second shaft fluid channel and the second connection towards the sixth fluid contact in the arm module without flowing through the heat exchanger 355, so that the fluid 51 with the first temperature level is transferred to the end effector connecting side 35. Only in the return flow of the fluid 51, the fluid 51 is guided coming from the fifth fluid contact and the first connection via the heat exchanger. In the process, the fluid 51 flows through the primary side of the heat exchanger 355 and cools the stator 275 of each of the active arm modules 25 on the way back from the end effector connecting side 35 to the robot base 15. At the robot base 15, the recirculated fluid 51 is sucked in by the feed pump and fed into the fluid reservoir on the output side of the feed pump, so that the fluid 51 circulates in a circuit in the industrial robot 10.

This embodiment is of particular advantage when the end effector connecting side 35 requires a particularly high pressure level to operate the end effector. Due to the direct guidance of the fluid 51, a pressure loss in an forward path from the robot base 15 to the end effector connecting side 35 is particularly low, since a line length for the fluid 51 between the robot base 15 and the end effector connecting side 35 is particularly short.

Figure 16:
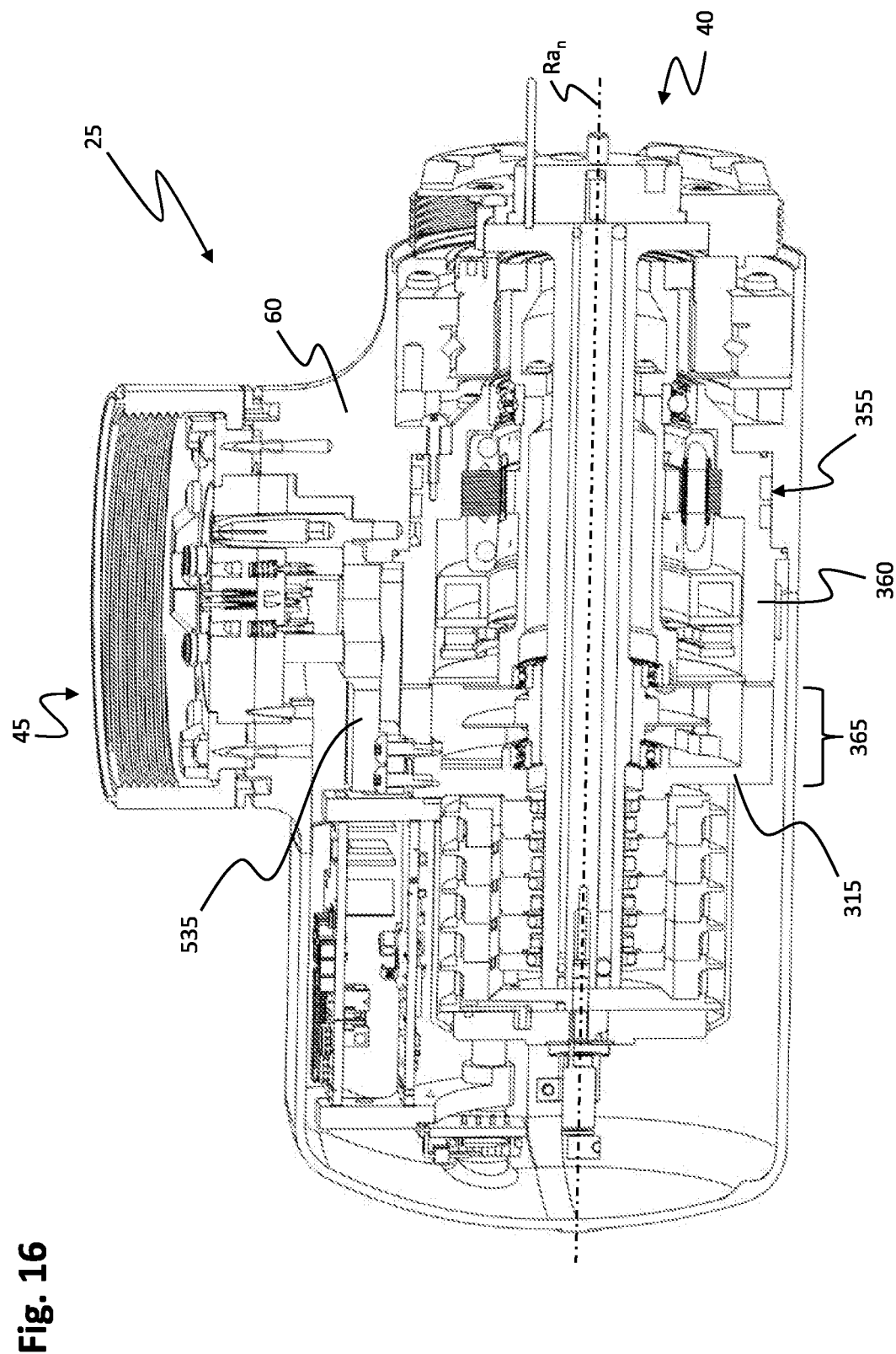
FIG. 16 is a perspective longitudinal section through an active arm module according to a second embodiment.

FIG. 16 shows a perspective longitudinal section through an active arm module 25 according to a second embodiment.

To better illustrate the individual components of the active arm module 25 shown in FIG. 16, the interfaces are not shaded.

The active arm module 25 according to the second embodiment (cf. FIG. 16) is essentially identical to the active arm module 25 according to the first embodiment shown in FIGS. 2 to 15. In the following, only the differences between the active arm module 25 according to the second embodiment shown in FIG. 16 and the active arm module 25 according to the first embodiment shown in FIGS. 2 to 15 will be discussed.

Compared to the first embodiment shown in FIGS. 2 to 15, the heat exchanger 355 of the active arm module 25 is further embodied in FIG. 16. In addition, the active arm module 25 in FIG. 16 has a conduit block 535. Furthermore, the tubing shown in FIG. 5 is omitted. The structural embodiment of the active arm module 25 according to the second embodiment will be discussed in detail in the following Figures.

Figure 17:
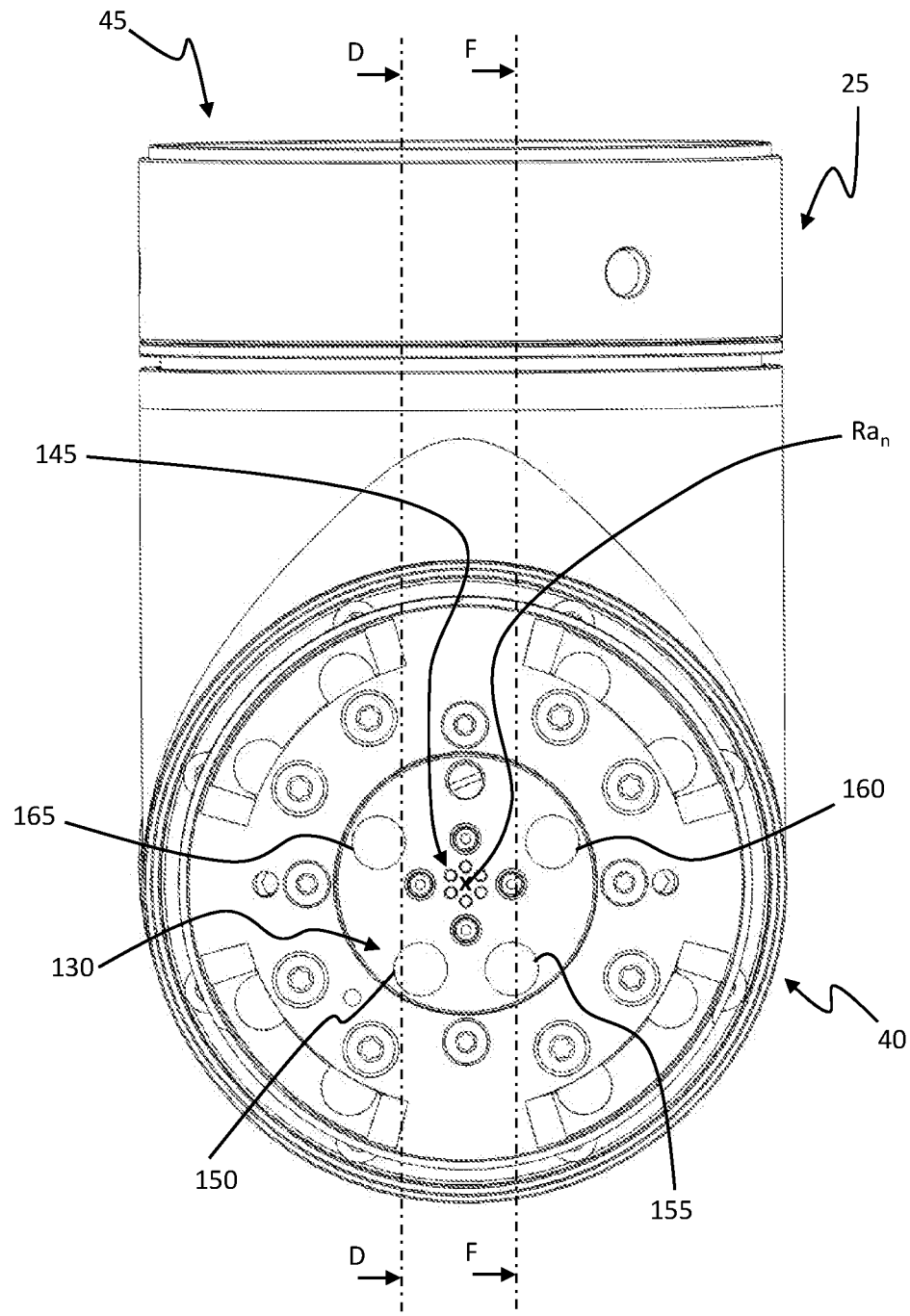
FIG. 17 is a side view of the active arm module shown in FIG. 16.

FIG. 17 shows a side view of the active arm module 25 shown in FIG. 16 according to the second embodiment.

The first connecting side 40 of the active arm module 25 according to the second embodiment is further configured compared to the first embodiment of the active arm module 25 shown in FIGS. 2 to 15 in that the first fluid contact device 130 instead of the first to fourth fluid contacts 150, 155, 160, 165 are arranged at an irregular distance from each other in the circumferential direction with respect to the axis of rotation $Ra_n$.

Additionally, the first data contact device 145 is multipolar and serves to electrically contact a second contact device 180 of a second connecting side 45 of a connected other active arm module 25 to transmit an electrical data signal.

The second connecting side 45 (covered in FIG. 17) is embodied correspondingly to the first connecting side 40, so that in the assembled state of the first active arm module 25.1 on the second active arm module 25.2, the first fluid contact device 130 contacts the second fluid contact device 175 to transmit the fluid 51 across the first and second fluid contact device 130, 175. Similarly, the first contact device 145 electrically contacts the second contact device 180 to transmit the electrical data signal between the first contact device 145 and the second contact device 180.

Figure 18:
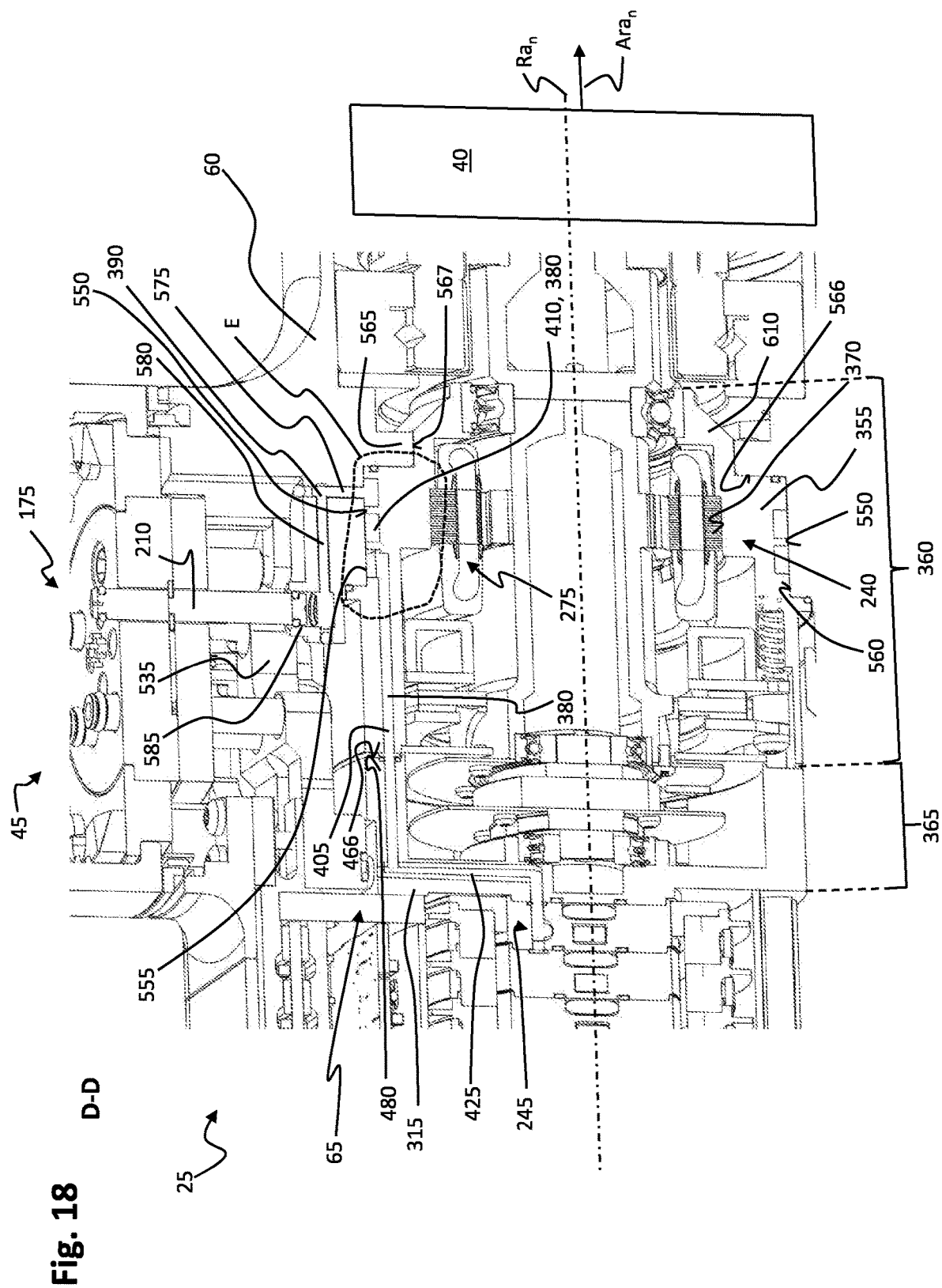
FIG. 18 is a sectional view along a sectional plane D-D shown in FIG. 17 through the active arm module shown in FIG. 17.

FIG. 18 shows a sectional view along a sectional plane D-D shown in FIG. 17 through the active arm module 25 shown in FIG. 17 according to the second embodiment.

In FIG. 18, the first heat exchanger section 360 and the second heat exchanger section 365 of the heat exchanger 355 are e.g. each embodied hollow-cylindrically about the axis of rotation $Ra_n$. The second heat exchanger section 365 is arranged on the side of the third housing 315 facing the first connecting side 40 (shown schematically in FIG. 18) and radially outside of the third housing 315. The third housing 315 and the second heat exchanger section 365 may be embodied in one piece and of the same material. In this case, the second heat exchanger section 365 projects axially beyond the third housing 315 at the front face in the direction of the first connecting side 40.

On a side of the second heat exchanger section 365 facing the first connecting side 40, the first heat exchanger section 360 adjoins the second heat exchanger section 365. In this case, the first heat exchanger section 360, on an axial side facing away from the first connecting side 40, lies with the third heat exchanger front face 480, which is e.g. of planar embodiment and runs in a plane of rotation with respect to the axis of rotation $Ra_n$, against the second heat exchanger front face 466 of the second heat exchanger section 365, preferably in a planar manner. As a result, the first heat exchanger section 360 and the second heat exchanger section 365 are thermally coupled to each other. Preferably, the first heat exchanger section 360 and the second heat exchanger section 365 are made of a thermally conductive material, e.g. aluminum. Radially inwardly of the first heat exchanger section 360, the drive device 240 is arranged. In this case, the first heat exchanger section 360 surrounds the drive device 240 in the radial direction.

The heat exchanger fluid channel 380 is embodied differently from the embodiment shown in FIGS. 2 to 15. The heat exchanger fluid channel 380 is reduced in its number of channel sections. In this regard, by way of example, the second channel section 410 of the heat exchanger fluid channel 380 is arranged on a second outer circumferential side 550 of the first heat exchanger section 360. The second channel section 410 is groove-shaped and is e.g. helically guided around the axis of rotation $Ra_n$.

The first housing 60 comprises a heat exchanger receptacle 555. The heat exchanger receptacle 555 is limited in a radial direction by a third inner circumferential side 560 of the first housing 60. The third inner circumferential side 560 may be embodied in a cylindrical shape extending around the axis of rotation $Ra_n$. On the axial side facing the third housing 315 and thus on an axial side facing away from the first connecting side 40, the heat exchanger receptacle 555 is open.

In the axial direction, the heat exchanger receptacle 555 is limited on the side facing the first connecting side 40 by a first shoulder 565 extending in the radial direction from the outside to the inside. On a side facing away from the first connecting side 40, the first shoulder 565 has a first shoulder surface 566 which essentially extends in a plane perpendicular to the axis of rotation $Ra_n$. On the radially inner side, the first shoulder 565 limits a feedthrough 567 which adjoins the first shoulder surface 566 on the radially inner side.

Figure 21:
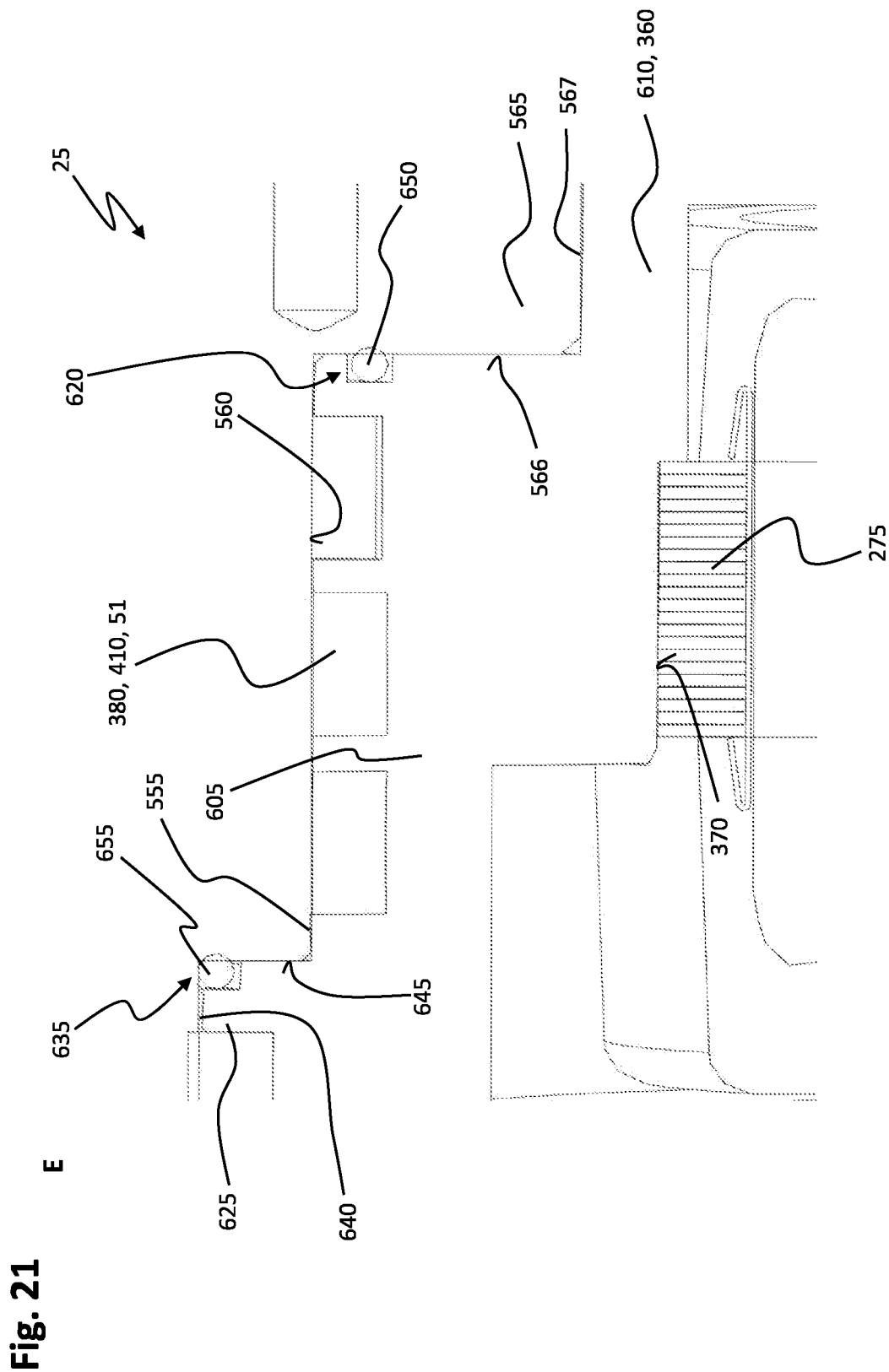
FIG. 21 is a section E of the sectional view through the active arm module indicated in FIG. 18.

Further, the first housing 60 includes a second recess 640 formed circumferentially about the axis of rotation $Ra_n$. The second recess 640 adjoins an axial end of the first housing 60 on an axial side facing away from the first connecting side 40 and may be embodied to extend on a circular path around the axis of rotation $Ra_n$. On the side facing the first connecting side 40, the second recess 640 adjoins the heat exchanger receptacle 555 (the second recess 640 is shown in FIG. 21). A recess base 645 (cf. FIG. 21) of the second recess 640 extends substantially in a plane of rotation perpendicular to the axis of rotation $Ra_n$ and is part of the third inner circumferential side 560.

In the embodiment, the first channel section 405 has an exemplary bore-like embodiment and extends in parallel to the axis of rotation $Ra_n$ through both the first heat exchanger section 360 and the second heat exchanger section 365. In this case, on the side facing the first connecting side 40, the first channel section 405 opens out into the second channel section 410. On the side facing away from the first connecting side 40, the first channel section 405 opens into the feed channel section 425 of the rotation transmitter 245. In the radial direction, the first channel section 405 is thereby arranged at an offset radially outwardly with regard to the axis of rotation $Ra_n$.

In the axial direction, e.g. the conduit block 535 is arranged between the first housing 60 and the rotation transmitter 245, in particular the third housing 315. In this case, the conduit block 535 is arranged radially outside of the first heat exchanger section 360 and the second heat exchanger section 365.

Furthermore, the first fluid line 390 is arranged in the first housing 60. The first fluid line 390 replaces the first fluid line 390 shown in FIGS. 2 to 15, which is embodied as a tube line. The first fluid line 390 e.g. comprises a first bore section 575 and a second bore section 580. The first bore section 575 extends radially outwardly and opens radially inwardly at the second channel section 410. The second bore section 580 extends in parallel to the axis of rotation $Ra_n$ from an axial side of the first housing 60 facing away from the first connecting side 40 toward the first bore section 575 and opens into the first bore section 575. The first bore section 575 is arranged radially outwardly of the second channel section 410.

A threaded hole 585 is arranged in the first housing 60 from radially outward to radially inward. The fifth fluid contact 210 of the second fluid contact device 175 of the second connecting side 45 is screwed into the threaded bore 585. The first bore section 575 and the second bore section 580 are each closed towards the outside so that fluid 51 is prevented from leaking from the first bore section 575 or the second bore section 580 into the first housing interior 65. The first fluid line 390 connects the fifth fluid contact 210 to the second channel section 410, eliminating the need for the return channel section 430 and the first connection 385.

Figure 19:
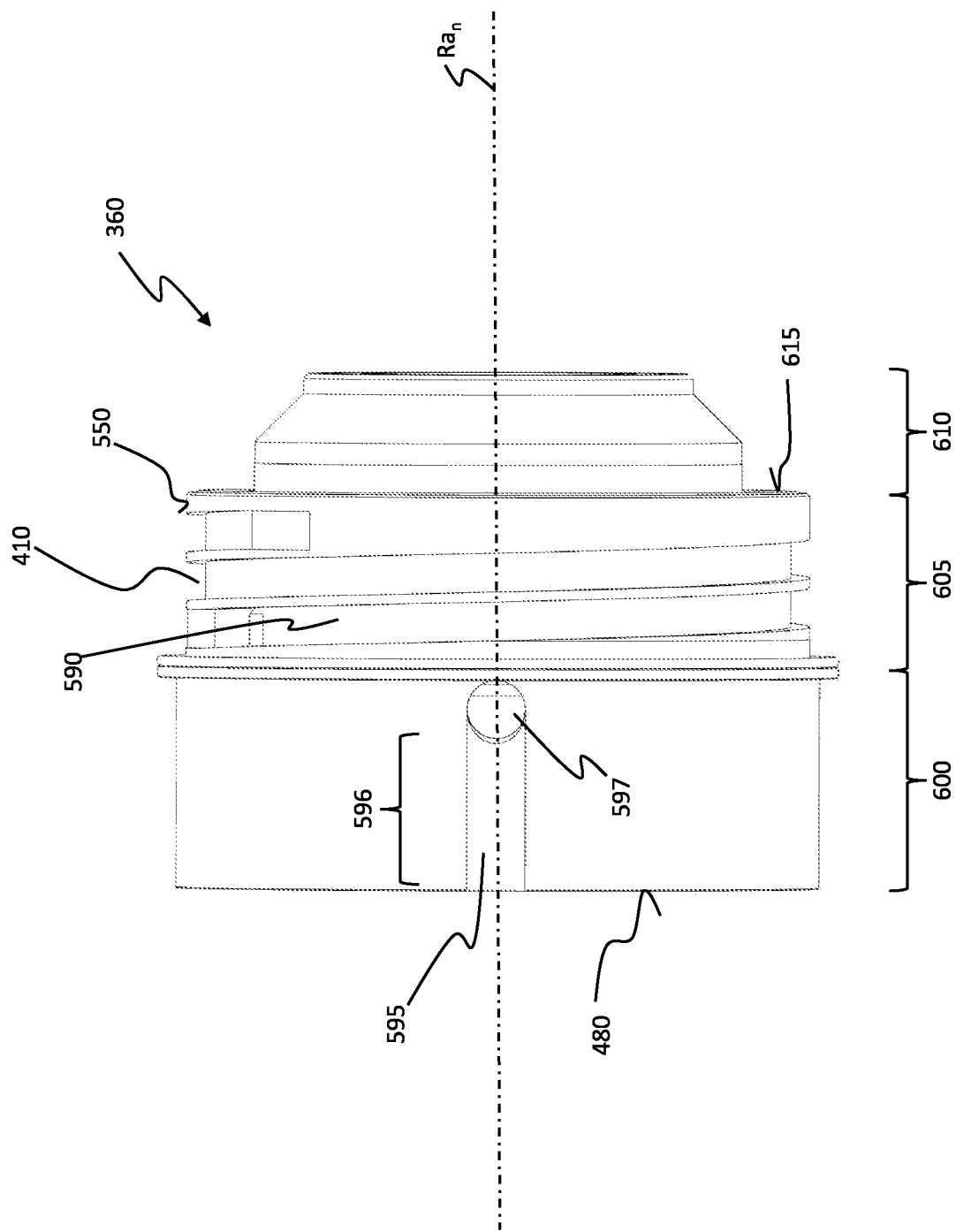
FIG. 19 is a side view of a first heat exchanger section shown in FIG. 18 of the active arm module shown in FIG. 16.

FIG. 19 shows a side view of the first heat exchanger section 360 shown in FIG. 18.

The first heat exchanger section 360 comprises a first partial area 600, a second partial area 605, and a third partial area 610. The first partial area 600 is hollow cylindrical in shape and is axially adjacent to the third heat exchanger front face 480. The second partial area 605 adjoins the first partial area 600 on an axial side of the first partial area 600 away from the third heat exchanger front face 480. The second partial area 605 is also substantially hollow-cylindrical in shape and may have a slightly smaller radial extent than the first partial area 600.

Between the second partial area 605 and the third partial area 610, the first heat exchanger section 360 has a second shoulder surface 615. The second shoulder surface 615 is annular and extends in a plane of rotation perpendicular to the axis of rotation $Ra_n$. The second shoulder surface 615 forms a second shoulder between the second partial area 605 and the third partial area 610 on the axial side facing the first connecting side 40 on the first heat exchanger section 360.

The third partial area 610 joins the second partial area 605 radially on the inside of the second shoulder surface 615 on a side facing away from the first partial area 600 in the axial direction. The basic shape of the third partial area 610 is conical.

The second channel section 410 is arranged at the second partial area 605 and is formed in at least one winding 590 enclosing an angular segment of at least 300° embodied extending around the axis of rotation $Ra_n$. Preferably, the second channel section 410 is embodied to extend in a helical manner around the axis of rotation $Ra_n$ in preferably a plurality of windings 590 on the second outer circumferential side 550.

Axially offset from the second channel section 410, the second heat exchanger section 365 comprises a line guide 595 in the first partial area 600. The line guide 595 begins in the axial direction at the third heat exchanger front face 480. The line guide 595 is formed in a first guide section 596 in a groove-like manner in the second outer circumferential side 550 running in parallel to the axis of rotation $Ra_n$. On the side facing the second partial area 605, the line guide 595 is embodied in a bore-like manner in a second guide section 597 and extends from the second outer circumferential side 550 from radially outwards towards the inside and opens out at the second inner circumferential side 370 of the first heat exchanger section 360.

The line guide 595 is used to route electrical connection conduits of the stator 275 through the first heat exchanger section 360. The cable guide 595 is arranged at a distance from the first and second channel sections 405, 410. In this regard, the line guide 595 is sealed from the heat exchanger fluid channel 380 so that fluid 51 is prevented from entering the line guide 595.

Figure 20:
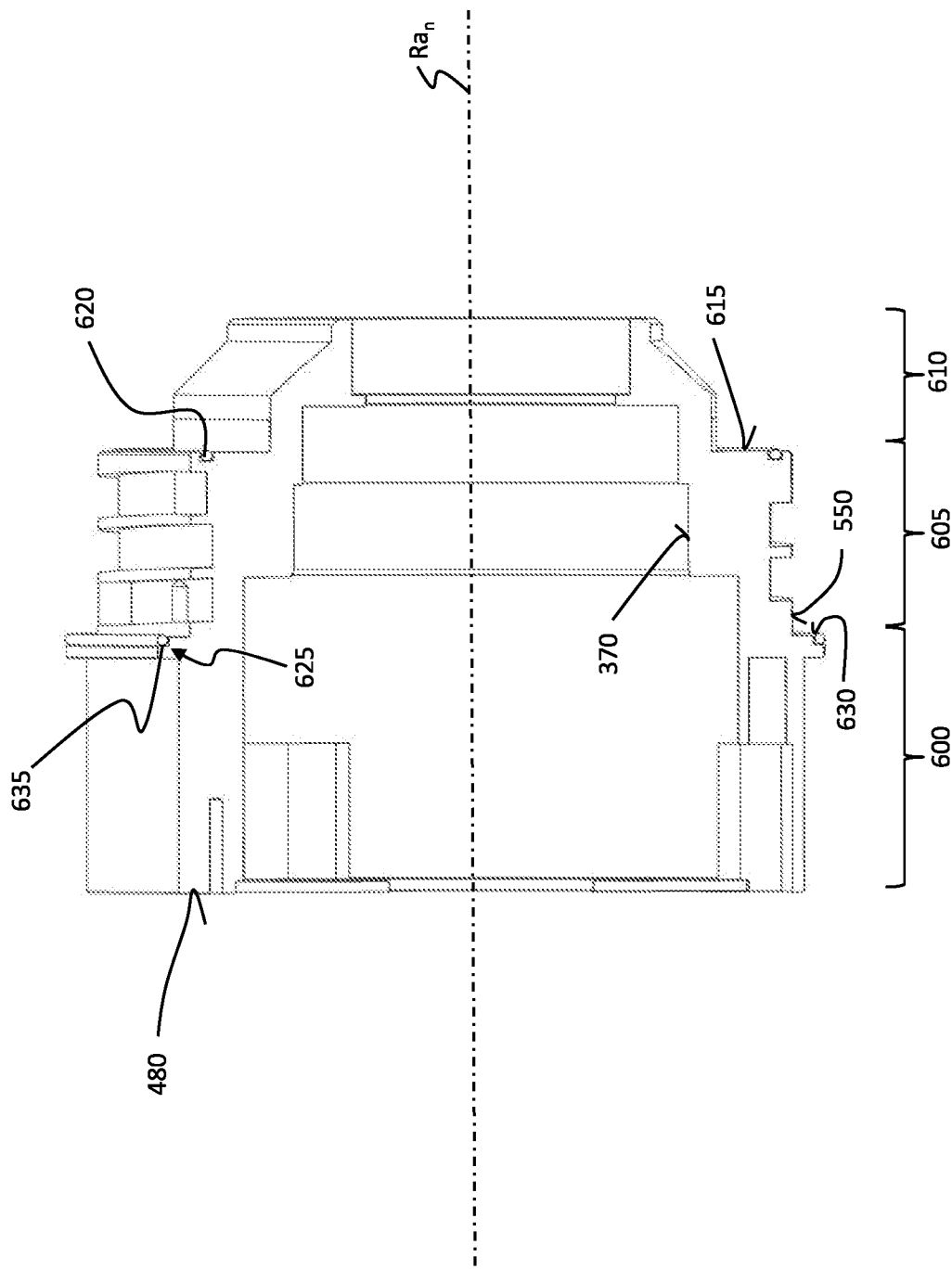
FIG. 20 is a longitudinal section through the first heat exchanger section shown in FIG. 19.

FIG. 20 shows a partial sectional view through the first heat exchanger section 360 shown in FIG. 19. The partial sectional view of FIG. 20 runs along a sectional plane that is in parallel to the axis of rotation $Ra_n$.

For example, a first sealing groove 620 is arranged in the second shoulder surface 615. The first sealing groove 620 is embodied circumferentially around the axis of rotation $Ra_n$. The first sealing groove 620 is open on the side facing the first connecting side 40.

A third shoulder 625 is further arranged on the second outer peripheral surface 550. The third shoulder 625 is arranged at a transition between the first partial area 600 and the second partial area 605. The third shoulder 625 extends from radially inward to radially outward. On the axial side facing the first connecting side 40, the third shoulder 625 comprises a third shoulder surface 630 that substantially extends in a plane of rotation perpendicular to the axis of rotation $Ra_n$. In addition, a second sealing groove 635 is arranged in the third shoulder 625, for example, wherein the second sealing groove 635 may be embodied to be open radially outwardly and axially in the direction of the first connecting side 40. The second sealing groove 635 may also be arranged radially inwardly offset from an outer end of the third shoulder 625 and embodied in a closed manner towards the outside. The second channel section 410 is axially arranged between the second shoulder 615 and the third shoulder 625.

FIG. 21 shows a section E marked in FIG. 18 of the sectional view through the active arm module 25 according to the second embodiment.

In the assembled state of the active arm module 25, the third partial area 610 extends through the feedthrough 567. Furthermore, radially inwardly the stator 275 abuts on the second inner circumferential side 370 in the second partial area 605 and is thermally connected to the first heat exchanger section 360.

The first heat exchanger section 360 engages in the heat exchanger receptacle 555 with the second section 605. Thereby, the third inner circumferential side 560 radially outwardly limits the second channel section 410. Thus, the second channel section 410 is embodied in a particularly simple manner. Furthermore, the third shoulder 625 engages in the second recess 640.

In the first sealing groove 620, a first sealing element 650 is arranged in sections, by way of example. The first sealing element 650 may e.g. be a first sealing ring. In the assembled state, the first sealing element 650 abuts on the first shoulder surface 566 of the first shoulder 565 and forms a first sealing plane. The first sealing element 650 provides a fluid-tight seal of the heat exchanger fluid channel 380 on the side facing the first connecting side 40.

In the second sealing groove 635, a second sealing element 655 is e.g. arranged in sections, which may be embodied as a second sealing ring. The second sealing element 655 abuts on the recess base 645. Additionally, the second sealing element 655 may also abut on the third inner circumferential side 560 of the second recess 640 due to the outwardly open configuration of the second sealing groove 635. Together with the recess base 645, the second sealing element 655 forms a second sealing plane. Thereby, the second sealing element 655 axially seals the heat exchanger fluid channel 380 on the side of the second channel section 410 facing away from the first connecting side 40. This prevents the fluid 51 from escaping from the heat exchanger fluid channel 380, in particular the second channel section 410, at the second sealing element 655.

Due to the two sealing levels, a reliable sealing that automatically adjusts during insertion may be ensured when inserting the first heat exchanger section 360 into the first housing 60. Furthermore, the insertion of liquid sealing may be dispensed with, so that the sealing is particularly reliable.

Figure 22:
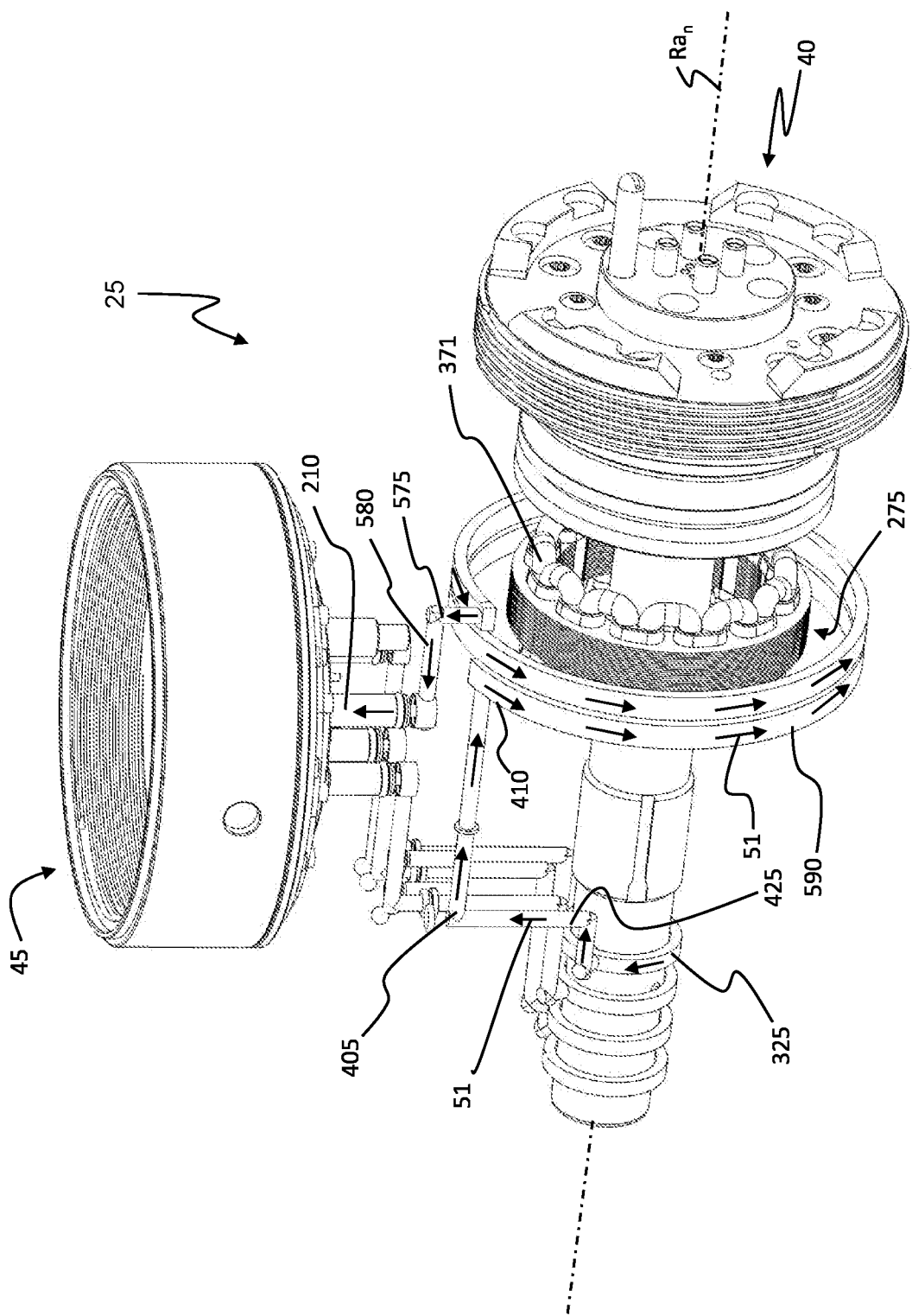
FIG. 22 is a perspective view of the active arm module shown in FIGS. 16 to 18 according to the second embodiment.

FIG. 22 shows a perspective view of the active arm module 25 shown in FIGS. 16 to 18 according to the second embodiment.

For the sake of clarity and to improve the description of the functionality of the active arm module 25, numerous components of the active arm module 25 are shown. In this regard, FIG. 22 is explained in conjunction with FIGS. 16 to 21, so that the reference signs shown in FIGS. 16 to 21 are also used for a precise explanation of the operation of the robot arm 20.

The fluid 51 enters the first pickup channel 325 at the first temperature level. From the pickup channel 325, the fluid 51 flows into the inlet channel section 425 and is guided radially outward by the inlet channel section 425. Radially outwardly, the fluid 51 is diverted from the supply channel section 425 into the first channel section 405. In the first channel section 405, which extends through both the first heat exchanger section 360 and the second heat exchanger section 365, the fluid 51 is directed toward the second channel section 410. Due to the thermal coupling of the first heat exchanger section 360 with the second heat exchanger section 365 and the third housing 315, the fluid 51 already absorbs heat from the third housing 315 and the second heat exchanger section 365 in the inlet channel section 425 and the first channel section 405.

On the side facing the first connecting side 40, the first channel section 405 opens into the second channel section 410. The fluid 51 is deflected from the first channel section 405 from the axial direction to the circumferential direction and the fluid 51 is preferably guided around the first heat exchanger section 360 several times in the windings 590 about the axis of rotation $Ra_n$. As a result, the second channel section 410 comprises a particularly long channel length and the fluid 51 guided in the second channel section 410 may absorb a particularly large amount of heat from the first heat exchanger section 360.

The fact that the second channel section 410 is arranged in the second partial area 605 of the first heat exchanger section 360 and has a particularly small radial distance from the stator 275 ensures particularly good heat transfer between the fluid 51 and the stator 275. In particular, this allows windings 371 of the stator 275 to be cooled particularly well.

After the fluid 51 flows through the windings 590 of the second channel section 410, the fluid 51 is directed radially outward into the first bore section 575. Radially outwardly, the fluid 51 flows from the first bore section 575 into the second bore section 580 oriented in parallel to the axis of rotation $Ra_n$. The fluid 51 is directed from the first bore section 575 through the second bore section 580 to the fifth fluid contact 210 of the second connecting side 45.

Figure 23:
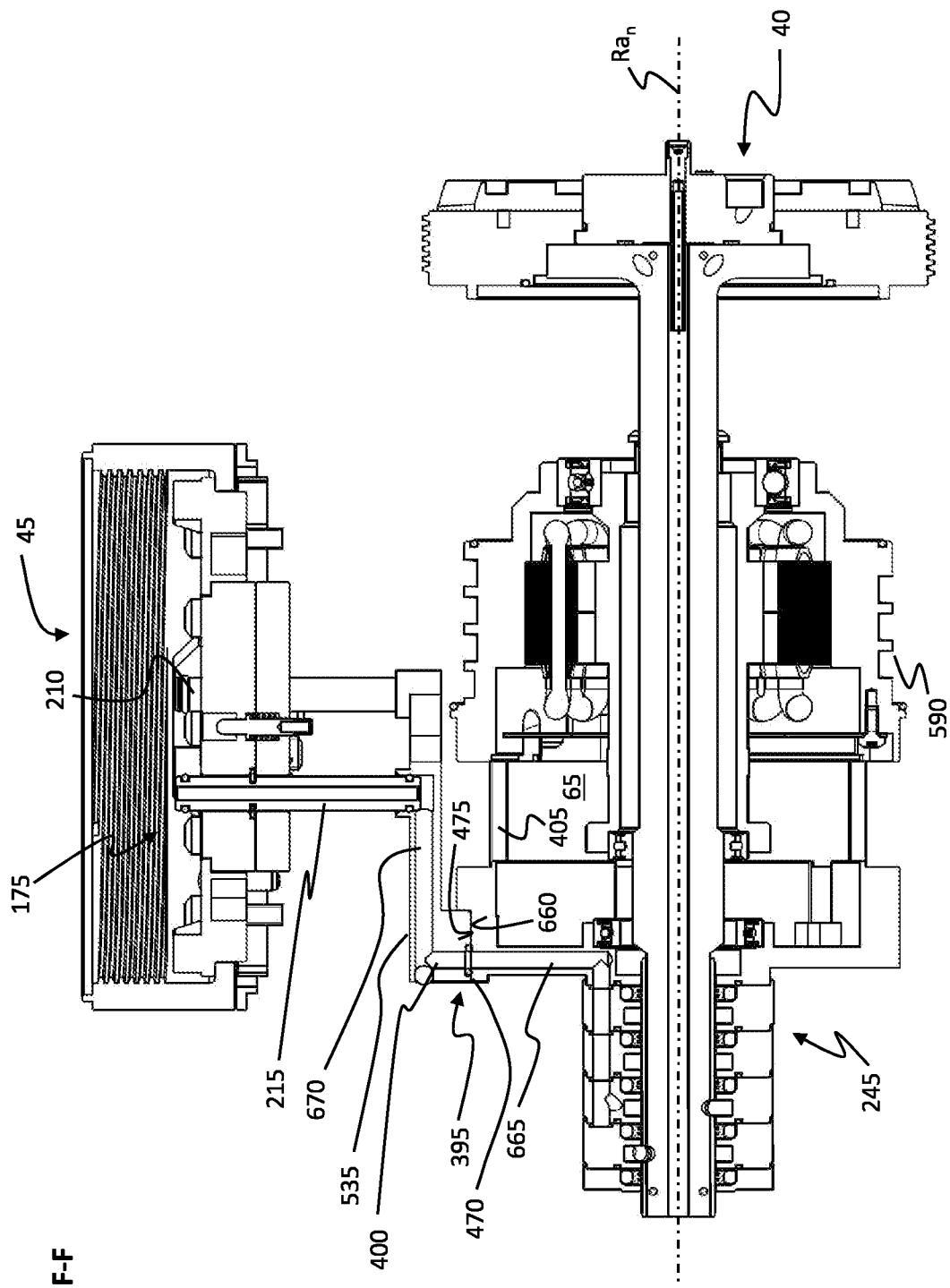
FIG. 23 is a sectional view along a sectional plane F-F shown in FIG. 17 through the active arm module according to the second embodiment.

FIG. 23 shows a sectional view along a sectional plane F-F shown in FIG. 17 through the active arm module 25 according to the second embodiment.

In order to dispense with the second to fourth fluid lines shown as tube lines in FIG. 5, in the embodiment the conduit block 535 is arranged between the second connecting side 45 and the rotation transmitter 245. Depending on the configuration of the first and second connecting sides 40, 45, the conduit block 535 has a corresponding number of fluid lines 400 minus the first fluid line 390 guided in the first housing 60. Thus, in the embodiment, the second through fourth fluid lines 400 are formed in the conduit block 535. However, what is explained below for the second fluid line 400 also applies to them. The only difference is that the third and fourth fluid lines are offset and fluidically separated from the second fluid line 400.

On a side facing the second connecting side 45, the sixth to eighth fluid contacts 215, 220, 225 are fixed, e.g. screwed, to the conduit block 535 in a fluid-tight manner with respect to the first housing interior 65.

In sectional view, the conduit block 535 has a substantially L-shaped configuration. Thereby, with a support surface 660 arranged on a side of the conduit block 535 facing away from the second connecting side 45 and e.g. arranged at a short side of the L-shaped cross-section, the conduit block 535 rests on the recess base 475 of the first recess 470 of the rotation transmitter 245. Thereby, the conduit block 535 engages the first recess 470 in sections. As an example, the first recess 470 in FIG. 23 is embodied significantly flatter in radial direction with respect to the axis of rotation $Ra_n$ than as shown in FIG. 8. Thus, the manufacturing effort for the rotation transmitter 245 may be kept particularly low.

The second fluid line 400 comprises a first line section 665 and a second line section 670. The first line section 665 and the second line section 670 are each exemplarily embodied as a bore in the conduit block 535. Thereby, at the support surface 660, the first line section 665 opens at the second connection 395 of the rotation transmitter 245. Thereby, the first line section 665 may be guided in a tangential plane with respect to the rotational axis $Ra_n$. The first line section 665 extends radially outwardly from the second connection 395 and opens radially outwardly into the second line section 670. The second line section 670 runs in parallel to the axis of rotation $Ra_n$ and opens into the sixth fluid contact 215 on an axial side facing away from the first line section 665.

At the transition between the sixth fluid contact 215 and the second line section 670, the second fluid line 400 is sealed in each case by a third sealing element, e.g. by a third sealing ring, in order to ensure reliable sealing of the fluid 51 at the conduit block 535 even when the fluid 51 is highly pressurized.

Due to the conduit block 535, the fluid 51 is exchanged between the sixth to eighth fluid contacts 215, 220, 225 and the rotation transmitter 245, and each is fluidically separated in the conduit block 535. As a result, the tube lines as shown in FIG. 5 for connecting the rotation transmitter 245 to the second fluid contact device 175 may be dispensed with. Furthermore, the conduit block 535 may be mounted particularly easily.

The conduit block 535 further allows and compensates for an axial offset of the second to fourth connections 395 relative to the second fluid contact device 175 and the spatially offset arrangement of the sixth to eighth fluid contacts 215, 220, 225.

The embodiment of the industrial robot 10 described in FIGS. 1 to 23 has the advantage that the additional cooling of the drive device 240 also allows the drive device 240 to be operated with higher currents without causing the drive device 240 to thermally overheat. As a result, the drive device 240 provides a higher torque for the same size. This results in the active arm module 25 being capable of carrying a greater load than an uncooled active arm module 25.

It is noted that not only the fluid 51, but also a further fluid may be provided via the robot base 15. The further fluid may be selected to be identical to the fluid 51, but may have a different temperature and/or pressure level than the fluid 51. The further fluid may be transmitted between the robot base 15 and the end effector connecting side 35 via the third and/or fourth fluid contact, the third and/or fourth shaft fluid channel, the third and/or fourth pickup channel, and the seventh and/or eighth fluid contact of each active arm module 25. The way in which the fluid 51 and, as the case may be, the further fluid is to be guided in the robot arm is thereby determined by the robot base 15.

Cooling by the heat exchanger and the fluid 51 ensures that the individual first housings 60 of the active arm modules expand only slightly. In particular with the composition of the industrial robot 10 shown in FIG. 1 consisting of many different individual arm modules 18, a slight thermal expansion of the active arm modules 25, e.g. in particular an elongation of the active arm modules 25, has a significant overall effect on the positioning and repeatability of the industrial robot 10, so that if the thermal expansion of the first housing of the active arm modules 25 is kept particularly low, the positioning and repeatability of the industrial robot 10 may be increased, such as in pick-and-place tasks.

Furthermore, the active arm modules 25 have a substantially constant module temperature, allowing repeatability and absolute accuracy to be kept constant over long duration pick-and-place tasks.

In addition, the cooling increases the service life of electronic components, e.g. of the controller 250 and the converter 255, since a thermal load on the electronic components is reduced, so that the industrial robot 10 shown in FIG. 1 has a particularly long service life.

Thanks to its active cooling of the drive device 240, the industrial robot 10 described above is equally suitable for use at high altitudes, in particular, e.g. above 2,000 meters, or in particularly hot regions or under operating conditions, e.g. in large-scale industrial plants for metal production, since the active cooling allows heat to be dissipated from the industrial robot 10 particularly well.

Furthermore, as described above, in addition to the increase in performance in continuous operation, a shortening of the service life is reduced, as well. Also, the active arm module 25 has a particularly good derating curve.

This invention has been described with respect to exemplary embodiments. It is understood that changes can be made and equivalents can be substituted to adapt these disclosures to different materials and situations, while remaining with the scope of the invention. The invention is thus not limited to the particular examples that are disclosed, but encompasses all the embodiments that fall within the scope of the claims.

What is claimed is:

1. An active arm module for a modular robot arm of an industrial robot, comprising:
   a first housing,
   a heat exchanger,
   a drive device, and
   a first connecting side of the active arm module comprising a first connecting plate;
   wherein the first connecting plate is mechanically connectable to a further arm module or a robot base of the robot arm for transmitting drive and support forces,
   wherein the first housing extends along an axis of rotation and defines an interior space receiving the drive device,
   wherein the heat exchanger at least partially accommodates the drive device and is thermally coupled to the drive device,
   wherein the heat exchanger comprises at least a heat exchanger fluid channel, and
   wherein the heat exchanger is configured to exchange heat between the drive device and a fluid, via a first fluid contact device arranged at the first connecting plate;
   wherein the fluid is exchangeable with the further arm module or the robot base via the first fluid contact device, and
   wherein the heat exchanger fluid channel is configured to be filled with the fluid for exchanging the fluid with the first fluid contact device;
   and further comprising a rotation transmitter,
   wherein the first connecting side is rotatably mounted about the axis of rotation,
   wherein the rotation transmitter connects the first fluid contact device to the heat exchanger fluid channel, and
   wherein the rotation transmitter is configured to exchange the fluid between the heat exchanger fluid channel of the heat exchanger and the first fluid contact device in a rotation of the first connecting side.

2. The active arm module according to claim 1, comprising:
   a second connecting side;
   wherein the second connecting side is mechanically connected to the first housing in a torque-proof manner,
   wherein the second connecting side comprises a second fluid contact device, and
   wherein the heat exchanger fluid channel of the heat exchanger is arranged between the second fluid contact device and the first fluid contact device, and the heat exchanger fluid channel is configured to exchange the fluid between the first fluid contact device and the second fluid contact device.

3. The active arm module according claim 2, comprising:
   a first fluid line,
   wherein the first fluid line is configured in a bore-like manner in the first housing,
   wherein the first fluid line extends at least partially in a radial direction to the axis of rotation and opens into the heat exchanger fluid channel on the inside,
   wherein radially outwardly the first fluid line is connected to the second fluid contact device, and
   wherein the first fluid line is configured to exchange the fluid between the second channel section and the heat exchanger fluid channel.

4. The active arm module according to claim 1,
   wherein the heat exchanger fluid channel is configured to wind around the drive device.

5. The active arm module according to claim 1,
   wherein the drive device comprises a rotor and a stator,
   wherein the rotor is coupled to the first connecting side in a torque-locking manner and is configured to rotate the first connecting side about the axis of rotation, and
   wherein the heat exchanger at least partially receives the stator and the heat exchanger at least partially abuts on the stator.

6. The active arm module according to claim 1,
   wherein the heat exchanger comprises at least a first heat exchanger section,
   wherein the first heat exchanger section is configured as a hollow-cylindrical structure extending around the rotational axis,
   wherein the first heat exchanger section is thermally connected to the drive device and surrounds the drive device radially on an outside of the drive device, and
   wherein the first heat exchanger section forms at least a section of the heat exchanger fluid channel and is configured to exchange heat between the fluid and the drive device.

7. The active arm module according to claim 6,
   wherein the heat exchanger comprises a second heat exchanger section axially adjacent to the first heat exchanger section,
   wherein the second heat exchanger section is hollow and extends cylindrically about the axis of rotation,
   wherein the heat exchanger fluid channel is alternately arranged in the first heat exchanger section and the second heat exchanger section,
   wherein the second heat exchanger section abuts on the first heat exchanger section at the front face and is thermally connected to the first heat exchanger section, and
   wherein the second heat exchanger section and a third housing of the rotation transmitter are configured integrally and of one material.

8. The active arm module according to claim 1,
   wherein the heat exchanger fluid channel comprises a second channel section, the second channel section being groove-shaped and guided around the axis of rotation.

9. The active arm module according to claim 8, comprising a rotation transmitter,
   wherein the first connecting side is rotatably mounted about the axis of rotation,
   wherein the rotation transmitter connects the first fluid contact device to the heat exchanger fluid channel, wherein the rotation transmitter is configured to exchange the fluid between the heat exchanger fluid channel of the heat exchanger and the first fluid contact device in a rotation of the first connecting side, wherein the heat exchanger abuts the rotation transmitter and the heat exchanger fluid channel comprises a first channel section, wherein the first channel section extends along a direction of the axis of rotation and is configured to extend in a bore-like manner at a distance from the axis of rotation, wherein the first channel section opens into the second channel section at one side and is connected to the rotation transmitter at another side, and wherein the first channel section is configured to exchange fluid between the rotation transmitter and the second channel section.

10. The active arm module according to claim 9, wherein the heat exchanger comprises a second heat exchanger section, wherein the second heat exchanger section is hollow and extends cylindrically about the axis of rotation, wherein the second heat exchanger section is connected to a third housing of the rotation transmitter, wherein the first heat exchanger section abuts on a fourth heat exchanger front face of the second heat exchanger section at a third heat exchanger front face facing away from the first connecting side, and wherein the first channel section is guided through the second heat exchanger section.

11. The active arm module according to claim 9, wherein the heat exchanger fluid channel comprises at least a third channel section, wherein the third channel section extends along a direction of the axis of rotation and is configured to be spaced apart from the axis of rotation, wherein the third channel section is circumferentially offset from the first channel section, and wherein the second channel section connects the first channel section to the third channel section.

12. The active arm module according to claim 11, wherein the heat exchanger fluid channel comprises at least a fourth channel section, wherein the fourth channel section is arranged at a second heat exchanger front face of the second heat exchanger section and is groove-shaped, wherein the fourth channel section extends around the axis of rotation, and wherein the third channel section opens at the fourth channel section; and wherein the first heat exchanger section abuts the second heat exchanger face and closes the fourth channel section.

13. The active arm module according to claim 8, comprising:
a gear device;
wherein the gear device is connected to the drive device in a torque-proof manner on an input side of the gear device and to the first connecting side in a torque-proof manner on an output side of the gear device, and
wherein the gear device abuts on the heat exchanger at the front face and closes the second channel section.

14. The active arm module according to claim 8, wherein:
the second channel section is arranged at a second outer circumferential side of the heat exchanger, the first housing comprises a heat exchanger receptacle on a third inner circumferential side, the heat exchanger at least partially engages in the heat exchanger receptacle, and the third inner circumferential side of the heat exchanger receptacle externally limits the second channel section; or
the second channel section is arranged at a first heat exchanger front face of the heat exchanger, and the second channel section is arcuate, extending around the axis of rotation.

15. The active arm module according to claim 1, wherein the first housing has a first shoulder extending inwardly in a radial direction relative to the axis of rotation with a first shoulder surface arranged on the surface of the first shoulder, wherein the first shoulder surface is arranged in an inclined manner with regard to the axis of rotation, wherein the heat exchanger has a second shoulder surface on a side facing the first connecting side, wherein a first sealing element comprising a first sealing ring is arranged at least partially between the first shoulder surface and the second shoulder surface, and wherein the first sealing element abuts the first shoulder surface and is configured to seal the heat exchanger fluid channel from an outlet of the fluid.

16. The active arm module according to claim 15, wherein the first housing has a second recess configured circumferentially about the axis of rotation, wherein the heat exchanger comprises a third shoulder configured circumferentially about the axis of rotation, which at least partially engages in the second recess, wherein the third shoulder extends radially outwardly with respect to the axis of rotation and comprises, on a side facing the first connecting side, a third shoulder surface which is oriented in an inclined manner with regard to the axis of rotation, wherein a second sealing element comprising a second sealing ring, is at least partially arranged between the third shoulder surface and a recess base of the second recess, wherein the heat exchanger fluid channel is arranged axially at least partially between the second shoulder surface and the third shoulder, and wherein the second sealing element is configured to seal the heat exchanger against an escape of the fluid from the heat exchanger fluid channel.

17. The active arm module according to claim 16, comprising:
a second connecting side and a conduit block having at least a second fluid line;
wherein the second connecting side is mechanically connected to the first housing in a torque-proof manner,
wherein the second connecting side comprises a second fluid contact device,
wherein the heat exchanger fluid channel of the heat exchanger is arranged between the second fluid contact device and the first fluid contact device, and the heat exchanger fluid channel is configured to exchange the fluid between the first fluid contact device and the second fluid contact device,
wherein the second fluid line is channel-shaped or bore-shaped, in the conduit block,
wherein a sixth fluid contact of the second fluid contact device is attached to the conduit block at a side of the conduit block facing the second connecting side,
wherein at a side of the conduit block facing away from the second connecting side, the conduit block abuts on the rotation transmitter, and wherein the second fluid line is configured for exchanging the fluid between the rotation transmitter and the second fluid contact device.

18. A robot arm, comprising at least one active arm module according to claim 1, and;
one further arm module,
wherein the further arm module comprises a first connecting side and a second connecting side, and
wherein the first connecting side of the active arm module is mechanically connected to the second connecting side of the further arm module for transmitting supporting forces and/or driving forces between the active arm module and the further arm module.

19. An industrial robot, comprising a robot arm according to claim 18, and:
a robot base,
wherein the first connecting side of the further arm module faces the robot base, and
wherein the fluid is transferrable between the robot base and the active arm module across the first connecting side of the further arm module, the second connecting side of the further arm module, and the first connecting side of the active arm module.

20. The robot arm according to claim 18, further comprising:
a robot base,
wherein the fluid is exchangeable via the mechanically connected first and second connecting sides of the active arm module and the further arm module, respectively, or via the robot base.

21. The active arm module according to claim 1, wherein the heat exchanger fluid channel is formed with at least one section configured helically around the axis of rotation, and extending around the drive device.

22. An active arm module for a modular robot arm of an industrial robot, comprising:
a first housing,
a heat exchanger,
a drive device, and
a first connecting side of the active arm module, comprising a first connecting plate;
wherein the first connecting plate is mechanically connectable to a further arm module or a robot base of the robot arm for transmitting drive and support forces,
wherein the first housing extends along an axis of rotation and defines an interior space receiving the drive device,
wherein the heat exchanger at least partially accommodates the drive device and is thermally coupled to the drive device,
wherein the heat exchanger comprises at least a heat exchanger fluid channel, and
wherein the heat exchanger is configured to exchange heat between the drive device and a fluid via a first fluid contact device arranged at the first connecting plate;
wherein the fluid is exchangeable with the further arm module or the robot base via the first fluid contact device, and
wherein the heat exchanger fluid channel is configured to be filled with the fluid for exchanging the fluid with the first fluid contact device,
wherein the heat exchanger fluid channel comprises a second channel section, the second channel section being groove-shaped and guided around the axis of rotation.

23. An active arm module for a modular robot arm of an industrial robot, comprising:
a first housing,
a heat exchanger,
a drive device, and
a first connecting side of the active arm module, comprising a first connecting plate;
wherein the first connecting plate is mechanically connectable to a further arm module or a robot base of the robot arm for transmitting drive and support forces,
wherein the first housing extends along an axis of rotation and defines an interior space receiving the drive device,
wherein the heat exchanger at least partially accommodates the drive device and is thermally coupled to the drive device,
wherein the heat exchanger comprises at least a heat exchanger fluid channel, and
wherein the heat exchanger is configured to exchange heat between the drive device and a fluid via a first fluid contact device arranged at the first connecting plate;
wherein the fluid is exchangeable with the further arm module or the robot base via the first fluid contact device, and
wherein the heat exchanger fluid channel is configured to be filled with the fluid for exchanging the fluid with the first fluid contact device,
wherein the heat exchanger fluid channel comprises a second channel section,
wherein the gear device is connected to the drive device in a torque-proof manner on an input side of the gear device and to the first connecting side in a torque-proof manner on an output side of the gear device, and
wherein the gear device abuts on the heat exchanger at the front face and closes the second channel section.

* * * * *